US008203746B2

(12) United States Patent
Shiozawa

(10) Patent No.: US 8,203,746 B2
(45) Date of Patent: Jun. 19, 2012

(54) IMAGE FORMING SYSTEM AND RECORDING MEDIUM STORING PROGRAM

(75) Inventor: Motohide Shiozawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 12/429,528

(22) Filed: Apr. 24, 2009

(65) Prior Publication Data

US 2009/0279109 A1 Nov. 12, 2009

(30) Foreign Application Priority Data

May 9, 2008 (JP) ................................ 2008-122963
Apr. 9, 2009 (JP) ................................ 2009-094619

(51) Int. Cl.
*G06K 15/02* (2006.01)

(52) U.S. Cl. ............ 358/1.2; 358/449; 358/1.1; 399/45; 399/341

(58) Field of Classification Search ................... 358/1.1, 358/1.2, 1.18; 399/45, 320, 321, 341
See application file for complete search history.

(56) References Cited

U.S. PATENT DOCUMENTS

| | | | | |
|---|---|---|---|---|
| 7,933,528 | B2 * | 4/2011 | Yoshioka et al. | 399/49 |
| 8,023,877 | B2 * | 9/2011 | Sudo et al. | 399/341 |
| 2003/0180063 | A1 * | 9/2003 | Kanesawa et al. | 399/328 |
| 2005/0214004 | A1 | 9/2005 | Toyohara et al. | |
| 2006/0198660 | A1 * | 9/2006 | Bessho | 399/341 |
| 2007/0146767 | A1 * | 6/2007 | Sakura | 358/1.14 |
| 2008/0102399 | A1 * | 5/2008 | Nakamura et al. | 399/397 |
| 2008/0152407 | A1 * | 6/2008 | Sudo et al. | 399/341 |
| 2009/0231626 | A1 * | 9/2009 | Koyano | 358/1.18 |
| 2010/0165398 | A1 * | 7/2010 | Watanabe | 358/1.15 |
| 2010/0178603 | A1 * | 7/2010 | Matsumoto et al. | 399/111 |
| 2010/0316397 | A1 * | 12/2010 | Kudou et al. | 399/45 |
| 2011/0129243 | A1 * | 6/2011 | Matsumoto | 399/45 |

FOREIGN PATENT DOCUMENTS

| | | | |
|---|---|---|---|
| CN | 101008818 | A | 8/2007 |
| JP | 5-265287 | A | 10/1993 |
| JP | 2004-151260 | A | 5/2004 |
| JP | 2005-173152 | A | 6/2005 |

OTHER PUBLICATIONS

Notice of Allowance,dated Nov. 14, 2011, in counterpart Korean Application No. 10-2009-0040109.
Korean Office Action for Korean counterpart application, dated Nov. 17, 2010, with Japanese Translation.
Office Action, dated May 11, 2011, in counterpart Chinese Patent Application No. 200910140578.6.
Korean Office Action for Korean counterpart application, dated Aug. 29, 2011.

* cited by examiner

*Primary Examiner* — Kimberly A Williams
(74) *Attorney, Agent, or Firm* — Fitzpatrick, Cella, Harper & Scinto

(57) ABSTRACT

An image forming system includes an image forming portion for forming a transparent image on a sheet by using transparent toner; an obtaining portion for obtaining a size of the sheet on which an image is to be formed; a storing portion for storing image data, for forming the transparent image on an entire image formable area of the sheet with the transparent toner, for each of a plurality of predetermined sheets different in size from each other; and a control portion for controlling the image forming portion so that the transparent image is formed on the sheet on the basis of the image data corresponding to the size of the sheet obtained by the obtaining portion.

4 Claims, 22 Drawing Sheets

TRANSPARENT PRINT MODE (a)

(b)

IMAGE FORMING SYSTEM AND RECORDING MEDIUM STORING PROGRAM

FIELD OF THE INVENTION AND RELATED ART

The present invention relates to an image forming system for forming an image on a sheet by using transparent toner and a recording medium in which a program is stored.

In recent years, an image forming apparatus using transparent toner for adjusting gloss of an image has been proposed. For example, Japanese Laid-Open Patent Application (JP-A) Hei 5-265287 discloses an image forming apparatus with an entire (whole) surface gloss mode in which gloss of a color image formed on a sheet is adjusted by forming an image so as to cover the entire surface of the sheet with the transparent toner. When the entire surface gloss mode is selected, control of image exposure and development is carried out so as to form a transparent toner layer on the entire surface of the sheet. In this case, the image forming apparatus forms the transparent toner layer on the entire surface of the sheet without reading image data for forming a transparent image from a scanner portion. For that reason, the image forming apparatus is considered that the image data for forming the transparent toner layer on the entire surface of the sheet is stored in a storing means or is generated by a generating means.

However, JP-A Hei 5-265287 does not disclose that the transparent image is formed on the entire surface of the sheet depending on a changed sheet size when the sheet size is changed.

Specifically, in the case of adjusting gloss of the entire surface of an A3-sized sheet, when processing is performed similarly as in the case of adjusting gloss of the entire surface of an A4-sized sheet, the transparent toner layer is formed on an area for the A4-sized sheet, not the entire surface of the A3-sized sheet. For that reason, contrary to a user's demand such that the user wanted to adjust the gloss of the entire surface of the sheet even in the case where the size of the sheet on which the image was to be formed was changed, it was not able to be said that the gloss of the entire surface of the sheet was adjustable.

SUMMARY OF THE INVENTION

A principal object of the present invention is to provide an image forming system capable of adjusting gloss of a sheet by using transparent toner.

Another object of the present invention is to provide an image forming system capable of adjusting gloss of a color image by using the transparent toner corresponding to a size of a sheet on which the color image is to be formed.

A further object of the present invention is to provide a recording medium, readable by a computer, storing a program capable of adjusting the gloss of the sheet by using the transparent toner.

According to an aspect of the present invention, there is provided an image forming system comprising:

image forming means for forming a transparent image on a sheet by using transparent toner;

obtaining means for obtaining a size of the sheet on which an image is to be formed;

storing means for storing image data, for forming the transparent image on an entire image formable area of the sheet with the transparent toner, for each of a plurality of predetermined sheets different in size from each other; and control means for controlling the image forming means so that the transparent image is formed on the sheet on the basis of the image data corresponding to the size of the sheet obtained by the obtaining means.

According to another aspect of the present invention, there is provided an image forming system comprising:

image forming means for forming a transparent image on a sheet, on which a color image is to be formed, by using transparent toner;

obtaining means for obtaining a size of the sheet on which an image is to be formed;

storing means for storing a portion image data including first image data for forming the transparent image on an entire image formable area of a sheet having a first size and including second image data for forming the transparent image on an entire image formable area of a sheet having a second size different from the first size;

selecting means for selecting the first image data when the size of the sheet obtained by the obtaining means is the first size and selecting the second image data when the size of the sheet obtained by the obtaining means is the second size is the second size; and control means for controlling the image forming means so that the transparent image on the basis of the image data selected by the selecting means is formed on the sheet.

According to a further aspect of the present invention, there is provided a recording medium, readable by a computer, storing an execute program specified below so that image data for forming a transparent image is sent to an image forming system for forming the transparent image by using transparent toner:

a size obtaining step for obtaining a size of a sheet on which the transparent image is to be formed;

an image data obtaining step for obtaining image data, corresponding to the size of the sheet obtained in the size obtaining step, from storing means in which the image data for forming the transparent image on an entire image formable area of the sheet for each of a portion of sheets different in size from each other; and a sending step of sending the image data to the image forming system so that the transparent image on the basis of the image data controlled in the image data obtaining step is formed on the sheet.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

In the following embodiments, a glossiness representing a degree of gloss was measured by using a handy glossimeter ("PG-1M", mfd. by Nippon Denshoku Industries Co., Ltd.). The measurement was performed in a 60 degree-gloss measurement mode in accordance with JIS Z 8741 (specular glossiness measuring method).

Hereinbelow, the embodiments to which the present invention is applied will be described. However, dimensions, materials, shapes, and relative arrangements of constituent elements described in the following embodiments may be appropriately changed depending on constitutions and various conditions for apparatuses or devices to which the present invention is applied. Therefore, it should be understood that the present invention is not limited to those specifically described in the following embodiments unless otherwise noted specifically.

Embodiment 1

In this embodiment, an image forming apparatus will be described. An MFP (multifunction peripheral) as the image forming apparatus includes a printer portion as an image forming means. The printer portion is capable of forming an image on a sheet by using color toner and transparent toner. The printer portion is capable of forming the image on the sheet on the basis of image data from a scanner, image data in a HDD (hard disk drive), or image data sent from a PC or the like. Further, the MFP has a portion for functions such as transmission of facsimile and sending of an image read by the scanner to an external device, in addition to printing and copying.

Herein, a system which includes the printer portion as the image forming means and executes printing in accordance with print instructions is referred to as an image forming system. An MFP 100 to be described in Embodiment 1 and Embodiment 2 includes the printer portion and executes the printing in accordance with the print instructions inputted from an external PC when functions as a printer, thus being referred to as the image forming system. A system constituted by the MFP 100 and an auxiliary device 114, to be described in Embodiment 3 and Embodiment 4 also includes the printer portion and executes the printer in accordance with the print instructions, thus being referred to as the image forming system. A system, constituted by the MFP and an MFP controller as a control device for controlling the MFP, to be described in Embodiment 5 also includes the printer portion and executes the printing in accordance with the print instructions, thus being referred to as the image forming system.

A schematic constitution of the MFP as the image forming apparatus will be described below. Then, an operation of the image forming apparatus will be described.

(Hardware Configuration of MFP)

A hardware configuration of the MFP as an example of the image forming apparatus will be described. The MFP is constituted by a controller portion, a scanner portion, and the printer portion. The respective portions will be described below in detail.

(Controller Portion)

Figure 1:
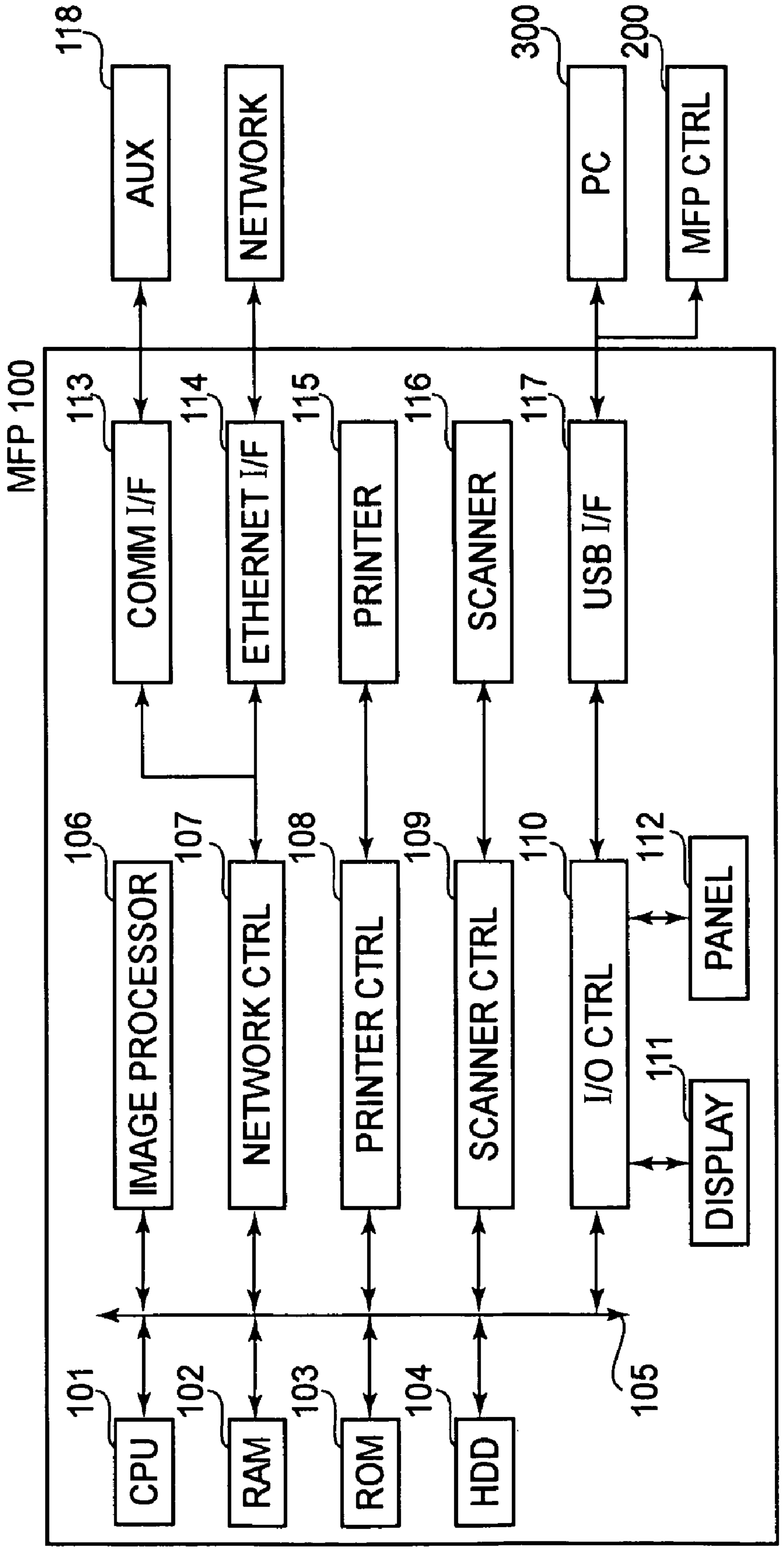
FIG. 1 is a block diagram showing a schematic constitution of an MFP (multifunction peripheral) in an embodiment of the present invention.

FIG. 1 is a block diagram showing an example of the hardware configuration of the MFP 100. A CPU (central processing unit) 101, a RAM (random access memory) 102, and a ROM (read only memory) 103 are connected to a bus 105. Similarly, a HDD (hard disk drive) 104, a dedicated image processing circuit 106, a network controller 107, a printer controller 108, a scanner controller 109, and an I/O controller 110 are connected to the bus 105. The various units connected to the bus 105 can communicate with each other through the bus 105.

In such a constitution, the CPU 101 sends control instructions or the like, through the bus 105, to the HDD 104, the network controller 107, the printer controller 108, the scanner controller 109, and the I/O controller 110. Further, the CPU 101 receives, through the bus 105, a state indicating signal or data such as image data from the HDD 104, the network controller 107, the printer controller 108, the scanner controller 109, and the I/O controller 110. Thus, the CPU 110 can control the various units constituting the MFP 100. Operations of the respective units will be described more specifically.

The CPU 101 and the dedicated image processing circuit 106 expand a program stored in, e.g., the ROM 103 into a primary memory which is called registry present in the CPU 101 or the dedicated image processing circuit 106 and execute the program. The RAM 102 is shared and used as a secondary memory needed during execution of the program by the CPU 101 or the dedicated image processing circuit 106. The HDD 104 having a larger storage capacity than that of the ROM 103 is principally used for storing the image data held in the MFP 100. The network controller 107 is a processing circuit for communicating with external equipment. The network controller 107 modulates and converts signals sent from the CPU 101 into signals in accordance with various standards. In this embodiment, the network controller 107 converts the sent signals into multi-valued signals in accordance with IEEE 803.2 standard and sends the signals to a network through an ethernet I/F 114. Further, the network controller 107 demodulates the multi-valued signals sent from the network through the ethernet I/F 114 and sends the signals to the CPU 101. As a result, the MFP 100 may communicate with an MFP controller 200 or a PC 300 through the network. Similarly, the network controller 107 converts a signal sent from the CPU 101 into a signal in accordance with ARCNET (attached resource computer network) standard and sends the signal to an auxiliary device 118 through an auxiliary I/F 113. Further, the network controller 107 demodulates a signal received from the auxiliary device 118 and sends the signal to the CPU 101. As the auxiliary device 118, e.g., a finisher as a post-processing device, a paper deck as an auxiliary sheet feeding device, and the like may be used. Picture data sent from the CPU 101 to a printer portion 115 as an image forming portion through the printer controller 108 is image data. Therefore, when a PDL (page description language) is inputted from the PC 300 to the MFP 100, the CPU 101 and the dedicated image processing circuit execute RIP (raster image processing) in a shared manner. Incidentally, the PDL is a programming language for instructing a picture image to be outputted to the MFP 100. Advantages of the PDL is that graphics can be held as vector data independent of a resolution of the printer and that an amount of data in the case of a simple line image can be made smaller than that of the image data. On the other hand, by using the PDL, the PDL is required to be re-converted into map image data needed during output at the printer portion, so that processing therefore incurs overhead. Such a processing for converting the PDL into the image data is referred to as the RIP. In this way, the image data converted from the PDL by the RIP is sent to the printer portion 115 through the printer controller 108. The printer portion 115 outputs a print on the basis of the received image data. Incidentally, the printer controller 108 controls the printer portion 115 on the basis of the externally inputted image data so that a toner image corresponding to the image data can be fixed on the sheet. The printer controller 108 can control the printer portion 115 on the basis of the image data externally sent through the network controller 207.

The scanner controller 109 controls an original image reading operation of an image sensor provided at a lower portion of an original carriage provided to a scanner portion 116 and an operation of an ADF (automatic document feeder). A user sets an original on the original carriage one by one when the image data of the original is read by the MFP 100. The scanner controller 109 receives original reading instructions and actuates the image sensor provided at the lower portion of the original carriage to scan the original surface, thus obtaining image data of the original set on the original carriage. Further, the user can provide instructions to set a plurality of sheets of the original and to read image data from the plurality of sheets. As a result, the ADF feeds one of the plurality of sheets of the original to the image sensor portion. Then, the ADF feeds one of the plurality of sheets, excluding the sheet which has already been fed to the image sensor portion, to the image sensor portion, thus repeating this operation until the feeding of the plurality of sheets of the original is completed. As a result, it is possible to automatically and successively read the image data from the original set to the ADF. Thus, in the case subjecting a large amount of the original to scanning, it is possible to save the user from placing another one of the plurality of sheets of the original on the original carriage one by one.

In a case where a body mode for storing an image in the HDD 104 provided in the MFP 100 is selected, the scanner controller 109 stores the image data obtained by the scanner portion 116 in the HDD 104. In the case where a copy mode for outputting the image data, obtained by the scanner portion 116, from the printer portion 115, the scanner controller 109 sends the image data obtained by the scanner portion 116 to the printer controller 108. As a result, the printer controller 108 outputs the received image data to the printer portion 115.

The I/O controller 110 communicate with the PC 300 or the MFP controller 200 through a USB (universal serial bus) I/F 117. Further, the I/O controller 110 is connected to a display 111 as a displaying means and an operation panel as an input means. The CPU 101 can obtain information inputted from the operation panel by the user through the I/O controller 110. Further, the I/O controller 110 displays information selectable by the user or information indicating a state of the MFP 100 on the display 111. On the display 111, a screen into which information on a size of the sheet to be used in the MFP 100 is to be inputted is displayed. Further, on the display 111, a mode for forming an image by using transparent toner so as to cover an entire surface of an image formable area of the sheet and a mode for forming the image on a part of the sheet by using the transparent toner.

(Image Data to be Stored in HDD)

The HDD 104 as a recording (storing) means can record (store) the image data received from the PC 300 or the like as an information processing device connected to the MFP 100 or the image data read by the scanner portion 116 as an image reading means. Further, the HDD 104 stores image data in advance. The image data stored in advance is used for forming the image by using the transparent toner so that at least a part of a color toner image is covered with the transparent toner. As the image data stored in the HDD 104 may include, e.g., those for printing a fixed phrase such as “SAMPLE”, “COPY INHIBIT”, or the like on the sheet by using the transparent toner. Further, the image data may also be logos for companies, organizations (groups), and the like.

Similarly, the HDD 104 stores the image data in advance for forming the transparent toner image on an entire image formable area of the sheet uniformly. The entire image formable area refers to an entire area of the sheet excluding a margin of the sheet. Therefore, in the case of no margin, the image data for forming the image on the entire surface of the sheet corresponds to the image data for forming the transparent image on the entire image formable area.

This will be described based on a specific embodiment below. A size of the sheet on which the image is to be formed is A3 size (297 mm×420 mm) and a margin of the sheet on which the image is not to be formed is ensured by 2 mm for each of a leading end portion, a trailing end portion, a left side portion, and a right side portion. In this case, an area of 293 mm×416 mm obtained by subtracting the margin values from the sheet size is the entire image formable area. For that reason, in the HDD the image data for forming the transparent toner image is stored in the area of 293 mm×416 mm.

The margin can be changed. Further, a plurality of image data different in margin value can be stored in the HDD. However, when the plurality of image data different in margin value is stored in the HDD, a remaining (storage) capacity of the HDD is decreased since the image data is stored in the HDD for each of margin settings. Further, in addition to the image data for each of the margin settings, when the image data is stored in the HDD for each of the sheet sizes, the remaining capacity of the HDD is further decreased. For that reason, in this embodiment, the image data for forming the image on the entire image formable area, in the case where the margin is ensured on the sheet by 2 mm for each of the leading end portion, the trailing end portion, the left side portion and the right side portion, is stored every sheet. Further, in this embodiment, the image data to be stored in the HDD is used for forming the entire image formable area on the sheet having a regular (standard) size.

In this embodiment, of sheet sizes defined by international standards, sheet sizes which are capable of being subjected to image formation by using the MFP and are frequently used in an associated country are referred to as regular (standard) sizes. Further, sheet sizes excluding the regular sizes are referred to as custom (irregular) sizes. For example, in Japan, during printing or copying using the MFP, A3 to A5 sizes of sheet sizes of A series (A0 to A10) defined by ISO (international organization for standardization) 216 are frequently used. Similarly, of sheet sizes of B series (B0 to B10) defined by ISO 216, B3 to B5 sizes are frequently used. For that reason, in the HDD, for each of the above-described regular sizes (A3 to A5 and B3 to B5), the image data for forming the image in the entire image formable area outside which the margin of 2 mm is provided for each of the leading end portion, the trailing end portion, the left side portion, and the right side portion is stored.

Similarly in Japan, sixmo size (203 mm×254 mm), 2 L size (127 mm×178 mm), KG size (102 mm×152 mm), and A3 plus (329 mm×483 mm) correspond to the custom sizes. Further, a so-called free size which can be designated by the user with respect to length and width dimensions is also classified into the custom sizes.

In view of the capacity of the HDD, it is also possible to store further much image data in the HDD in advance. In this embodiment, in the case where the sheet size is the custom size or in the case where the margin is changed even when the sheet size in the regular size, the CPU 101 as a generating means generates the image data such that the sheet is covered with the transparent toner in the entire image formable area.

The sheet size frequently used varies depending on countries. For that reason, the regular size also varies depending on regions in which the MFP is used.

In the case where the size of the sheet on which the image is to be formed is the regular size, the image data corresponding to the size data stored in the HDD 104 is sent to the printer portion as the image forming means. Then, the printer portion forms the image on the sheet on the basis of the received image data. Similarly, in the case where the size of the sheet on which the image is to be formed is the custom size, the image data generated by the CPU 101 as the generating means is sent to the printer portion as the image forming means. Then, the printer portion forms the image on the sheet on the basis of the received image data.

The connection relationship between the controller portion and the respective modulus and the image data stored in the HDD 104 are described above. Subsequently, a constitution of the scanner portion 116 and the printer portion 115 will be described in detail.

(Scanner Portion)

Figure 2:
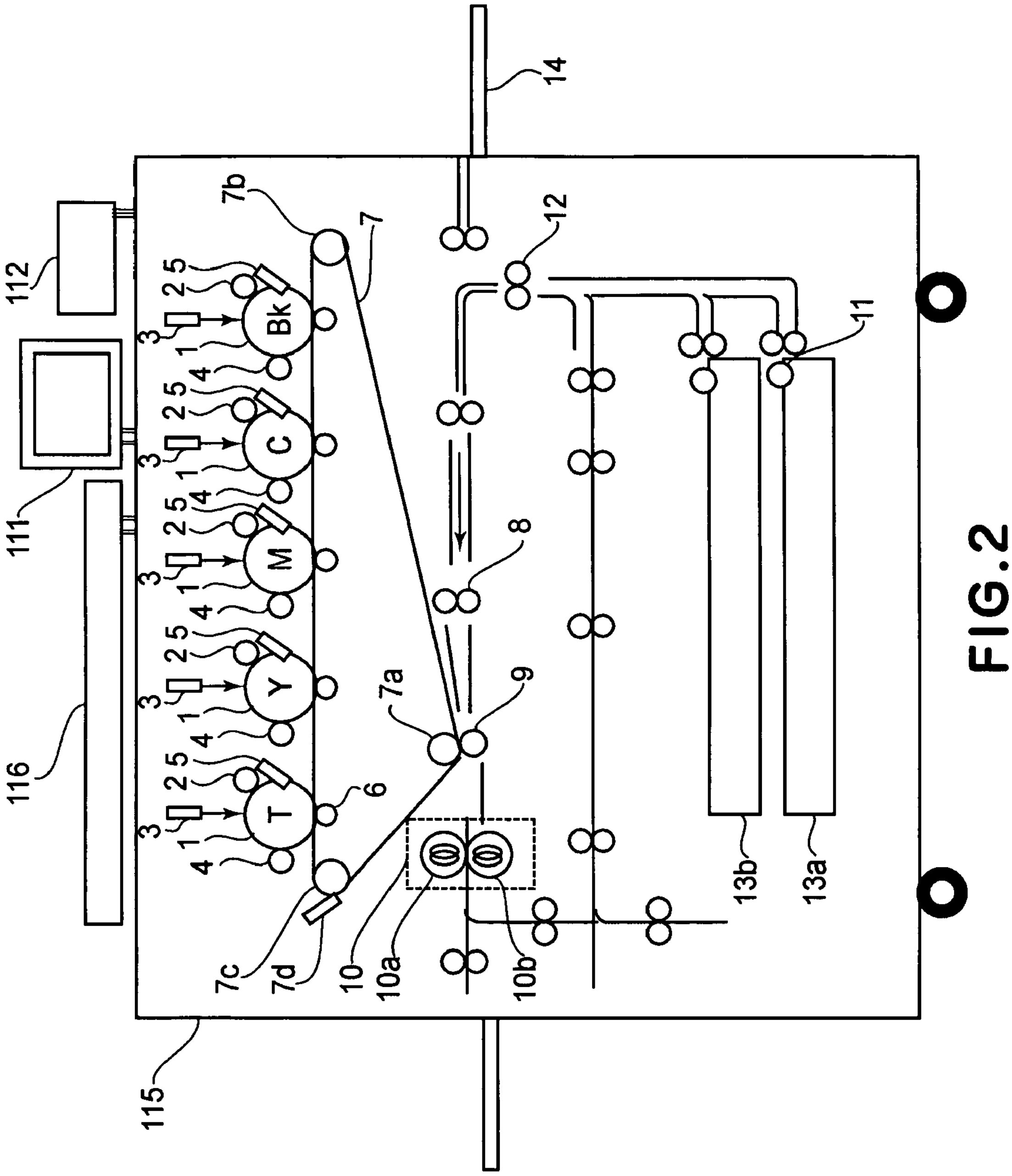
FIG. 2 is a schematic view showing a structure of the MFP in the embodiment of the present invention.

FIG. 2 is a schematic view for illustrating a structure of the MFP 100. The scanner portion in this embodiment will be described below. The scanner portion 116 is disposed above the printer portion 115 in FIG. 2. As described above, the scanner portion 116 is constituted by the image sensor as the photoelectric conversion element for reading the original image, the original carriage, and the ADF. The scanner portion 116 obtains the image data of the original set on the original carriage or the ADF. The image data obtained by the scanner portion 116 is sent to the scanner controller 109. The scanner controller 109 can send the image data obtained by the scanner portion 116 to the respective portions connected thereto through the bus 105.

(Printer Portion)

The printer portion 115 as the image forming means provided to the MFP 100 as the image forming apparatus will be described. In this embodiment, the printer portion is of an electrophotographic type. For that reason, the printer portion 115 includes a conveyance portion, an image forming portion, and a fixing portion. The conveyance portion, the image forming portion, and the fixing portion will be described below.

(Conveyance Portion)

The conveyance portion is constituted by cassettes 13*a* and 13*b*, a manual feeding tray 14, a pick-up roller 11, a conveyance roller pair 12, and a registration roller pair 8. The sheet is set in the cassettes 13*a* and 13*b*. In this embodiment, the size of the sheet set in the cassettes 13*a* and 13*b* is designated by operating the operation panel 102 by the user. The size of the sheet accommodated in the cassettes may also be detected by reading a position of a partitioning plate provided inside the cassettes. A flow of conveyance of the sheet set in the cassette 13*a* will be described.

The sheet set in the cassette 13*a* is fed by the pick-up roller 11 one by one. The sheet fed by the pick-up roller 11 is conveyed by the conveyance roller pair 12. The sheet conveyed by the conveyance roller pair 12 runs into the registration roller pair 8 which is at rest. The sheet which has run into the registration roller pair 8 is conveyed to a secondary transfer portion by the registration roller pair 8 rotated so as to be synchronized with the toner image on the intermediary transfer belt 7.

(Image Forming Portion)

The image forming portion is constituted by image forming stations for respective colors and an intermediary transfer belt unit. An image forming station T for forming the transparent toner image is constituted by a photosensitive drum 1, a charger 2, a laser scanner 3, a developing device 4, a primary transfer roller 6, and a drum cleaner 5. Also with respect to other colors, the image forming stations have the substantially same constitution except for the toner contained in the developing device. The intermediary transfer belt unit is constituted by the intermediary transfer belt 7, a follower roller 7*a*, a secondary transfer opposite roller 7*b*, and a driving roller 7*c*.

The constitution of the image forming portion will be described along a flow of formation of the toner image, for being transferred onto the sheet, on the intermediary transfer belt 7. The transparent toner image is formed by the image forming station T as a transparent image forming means. Similarly, a yellow toner image, a magenta toner image, a cyan toner image, and a black toner image are formed by image forming stations Y, M, C and Bk, respectively, as a color image forming means. The respective image forming stations T, Y, M, C and Bk are substantially horizontally provided. The toner images formed by the respective image forming stations T to Bk are respectively primary-transferred onto the intermediary transfer belt 7. Then, the toner images primary-transferred onto the intermediary transfer belt 7 are secondary-transferred onto the sheet at the secondary transfer portion.

The respective image forming stations T to Bk have the substantially same constitution and for this reason, the image forming station T for forming the transparent image will be described representatively. The image forming station T is constituted by the photosensitive drum 1, a charging roller 2, the laser scanner 3, the developing device 4, and the drum cleaner 5. The photosensitive drum 1 having a drum shape as an image bearing member is shaft-supported rotatably by an apparatus main assembly. Around the photosensitive drum 1, the charging roller 2 as a charging means, the laser scanner 3 as an image exposure means, and the developing device as a developing means are disposed.

A surface of the photosensitive drum 1 is electrically charged to a uniform potential by the charging roller 2. Then, an image signal for forming a transparent toner image 23 is inputted from the printer controller 108 into the laser scanner 3. The surface of the photosensitive drum 1 is irradiated with laser light, depending on the inputted image signal, by the laser scanner 3. As a result, electric charges at the surface of the photosensitive drum 1 are neutralized, so that an electrostatic latent image is formed on the surface of the photosensitive drum 1. Then, the electrostatic latent image formed on the surface of the photosensitive drum 1 is developed with transparent toner by the developing device 4. The transparent toner image obtained on the photosensitive drum 1 by the development is primary-transferred onto the intermediary transfer belt 7 as an image conveyance member by a primary transfer roller 6 disposed at a position opposite to the photosensitive drum 1 through the intermediary transfer belt 7. Transfer residual toner, remaining on the photosensitive drum 1, which has not been transferred onto the intermediary transfer belt 7 is collected by the drum cleaner 5. At the image forming station T, the transparent toner image is transferred onto the intermediary transfer belt 7 as described above. Toner images formed by other image forming stations Y, M, C and Bk are also similarly primary-transferred onto the intermediary transfer belt 7. Incidentally, the transparent toner image is first transferred onto the intermediary transfer belt 7 by the image forming station T. Therefore, when the image formation is effected by using the transparent toner, the transparent toner constituted an uppermost layer on the sheet. The transparent image forming station T for forming the transparent image is identical to other image forming stations for forming the color images except for the toner contained in the developing device 4. For that reason, depending on the image signal inputted into the laser scanner, the transparent image forming station T is capable of forming the transparent toner image on an entire sheet surface or on a part of the sheet surface.

The intermediary transfer belt 7 is stretched by the follower roller 7*a*, the secondary transfer opposite roller 7*b*, and the driving roller 7*c*. The follower roller 7*a* also functions as a tension roller, thus being rotated by the movement of the intermediary transfer belt 7 while imparting tension to the intermediary transfer belt 7. The secondary transfer opposite roller 7*b* is disposed opposite to a secondary transfer roller 9 through the intermediary transfer belt 7. Further, to the secondary transfer opposite roller 7*b*, a secondary transfer bias voltage is applied from a high-voltage power source (not shown) during the secondary transfer. The driving roller 7*c* is rotated by receiving a driving force from a driving motor (not shown). The intermediary transfer belt 7 stretched by the driving roller 7*c* is moved by the rotation of the driving roller 7*c* by receiving the driving force from the driving roller 7*c*.

In this manner, the toner images formed on the intermediary transfer belt 7 by the respective image forming stations T to Bk are conveyed to the secondary transfer portion. The toner images conveyed by the intermediary transfer belt 7 are transferred onto the sheet, conveyed to the secondary transfer portion, by applying a transfer bias to the secondary transfer roller 9 and the secondary transfer opposite roller 7*c*. Transfer residual toner, remaining on the intermediary transfer belt 7, which has not been transferred onto the sheet is collected by a belt cleaner 7*d* provided downstream of the secondary transfer portion.

In this manner, the toner images are transferred onto the sheet. The sheet onto which the toner images are transferred is conveyed to a fixing portion.

(Toner)

The toner accommodated in the developing device of the image forming station will be described. In this embodiment, with respect to the transparent toner and the color toners, a polyester-based resin material is used. As a method of manufacturing the toner, a pulverization method and a method (polymerization method) for directly manufacturing the toner in a medium, such as a suspension polymerization method, an interfacial polymerization method, or a dispersion polymerization method. In this embodiment, the toner manufactured by using the suspension polymerization method was used. The component and manufacturing method for the toner are not limited to those described above. Herein, the color toner is a generic name for yellow toner, cyan toner, magenta toner, and black toner, excluding the transparent toner.

The color toner is principally constituted by a polyester resin material and a pigment. Further, the transparent toner is principally constituted by the polyester resin material. The transparent toner and the color toners, used in this embodiment, have a glass transition point (Tg) of about 55° C. In this embodiment, the transparent toner was manufactured so as to have the glass transition point (Tg) substantially identical to that of the color toners. For that reason, in the case where the same fixing condition and the substantially same toner amount per unit area are employed for the transparent toner and the color toners, the color toners fixed on the sheet and the transparent toner fixed on the sheet have the substantially same glossiness.

The glass transition point (Tg) is not limited to that described above. When the type and a molecular weight of the resin material used for the transparent toner is changed, a melting proper is also changed. For that reason, the toner image fixed on the sheet under the same fixing condition provides a different glossiness depending on a toner property. Therefore, by manufacturing the transparent toner with the use of a resin material which has the glass transition point (Tg) lower than that of the color toners and is therefore liable to melt, compared with the case of the color toners, it is possible to obtain the transparent toner having high gloss after the fixation. Further, by manufacturing the transparent toner with the use of a resin material which has the glass transition point (Tg) higher than that of the color toners and is therefore less liable to melt, compared with the case of the color toners, it is possible to obtain the transparent toner having low gloss after the fixation. In this way, it is also possible to use the transparent toner having the glass transition point (Tg) different from that of the color toners.

Incidentally, when the amount of the color toners per unit area applied on the sheet is increased, an optical density of a resultant image is increased in proportional to the toner amount. Further, when the amount of the transparent toner per unit area applied on the sheet is increased, the gloss is changed in proportion to the toner amount. Even when the transparent toner is applied on the sheet, the transparent toner after the fixation is colorless and transparent, so that a resultant optical density is not substantially changed. Incidentally, when the sheet surface is sufficiently covered with the toners, the resultant gloss is not changed even when the amount of the transparent toner is increased.

(Fixing Portion)

As shown in FIG. 2, a fixing device 10 is disposed downstream of the secondary transfer portion with respect to a sheet conveyance direction. The fixing portion is constituted by the fixing device 10. The constitution of the fixing portion will be described along a flow of fixation of the transparent images transferred onto the sheet. The fixing device 10 is constituted by a fixing roller 10*a* and a pressing roller 10*b*. The fixing roller 10*a* and the pressing roller 10*b* press-contact each other and a fixing nip is formed therebetween. In this embodiment, outer diameters of the fixing roller 10*a* and the pressing roller 10*b* are both 80 mm. Further, lengths of the fixing roller 10*a* and the pressing roller 10*b* with respect to their rotational axis directions are both 350 mm. The fixing roller 10*a* is shaft-supported rotatably by another wall of the fixing device, and the pressing roller 10*b* is pressed against the fixing roller 10*a* with a pressure of 500 N (50 kgw) by a spring (not shown). The fixing roller 10*a* is a laminated member including, on an aluminum-made hollow core metal, a rubber layer as an elastic layer and a fluorine-containing resin material layer as a toner parting layer which are laminated. Further, inside the hollow core metal, a halogen heater as a heating source is provided. The hollow core metal may also be formed of other materials such as iron. Further, the heating source may also be replaced with that of an IH (induction heating) type using, e.g., electromagnetic induction heating. The fixing roller 10*a* is connected to a driving motor through a driving gear train and is rotated by a rotational driving force transmitted from the driving motor. The pressing roller 10*b* is, similarly as the fixing roller 10*a*, a lamination member in which the rubber layer and the fluorine-containing resin material layer are laminated, and the halogen heater is provided inside the hollow core metal. Further, the pressing roller 10*b* is rotated by the rotation of the fixing roller 10*a*.

Under such a fixing condition, the sheet on which the toner images are transferred at the secondary transfer portion passes through the fixing nip. As a result, the toner images transferred on the sheet are fixed on the sheet. The sheet on which the toner images are fixed passed through a conveyance path and is discharged outside the image forming apparatus.

In this embodiment, the sheet is separated from the fixing device 10, in a state in which a high temperature of about 90° C. to about 110° C. is kept, immediately after the sheet has passed through the fixing nip of the fixing device 10. That is, the fixing device 10 in this embodiment is of a "high-temperature separation type" in which the sheet starts to separate from the fixing device while keeping the state of the high temperature immediately after having passed through the fixing nip. The temperature at which the sheet is separated is affected by the fixing condition, a basis weight of the sheet, and the like. In this embodiment, the fixing device 10 constituted by a roller pair consisting of the fixing roller 10*a* and the pressing roller 10*b* is described above but may also be constituted by an endless belt for either one or both of a fixing side and a pressing side. The fixing method may also be those other than the above-described fixing method. As a result, the pressing roller as the image forming means can form the transparent image, on the sheet on which the color images are to be formed, by using the transparent toner.

The constitution of the printer portion along the flow of the toner image formation on the sheet is described above.

(Print Settings and Operation of Image Forming Apparatus Based Thereon)

As described above, with respect to the entire constitution of the MFP, the scanner portion and the printer portion are explained with reference to the schematic views. In this embodiment, the CPU 101 controls the respective portions in accordance with the program stored in the ROM 103. A screen for setting the mode and the sheet size on the display 111 will be described. The user operates the operation panel 112 in accordance with the screen displayed at the display 111, so that the user can effect various settings.

The screen to be displayed at the display 111 and items settable on the screen will be described and thereafter the operation of the MFP on the basis of set information will be described.

(Screen to be Displayed at Display of MFP 100)

Figure 3:
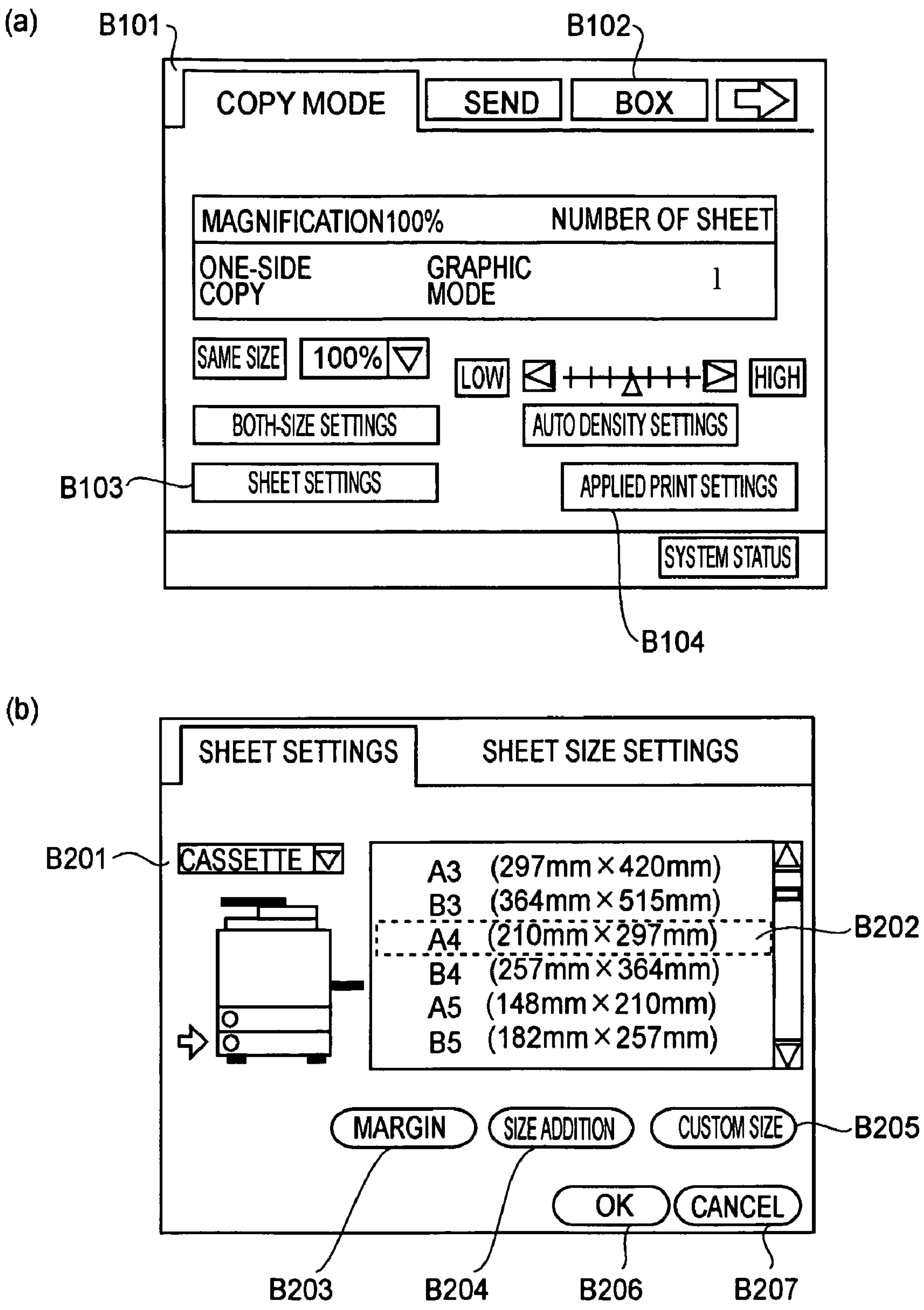
FIGS. 3(*a*), 3(*b*) and 4 are schematic views each showing an example of a screen displayed on a display of the MFP in the embodiment of the present invention.

(FIG. 3(*a*))

FIG. 3(*a*) is a schematic view showing an example of the screen to be displayed at the display 111. In a state in which the screen shown in FIG. 3(*a*) is displayed at the display 111 (in the copy mode), when a start button (not shown) is pressed by the user, the MFP 100 makes a copy of the original set on the original carriage. The mode of the MFP 100 is changed to a box mode by selection of B102 by the user. In the box mode, the user can output data stored in the HDD provided inside the MFP 100 at the printer portion. By selection of B101 by the user, the box mode of the MFP 100 changed to the copy mode.

In FIG. 3(*a*), the user can select B103 for "SHEET SETTINGS". When the user selects the "SHEET SETTINGS", the CPU 101 displays a screen shown in FIG. 3(*b*) at the display 111. Further, the user can select B104 for "APPLIED PRINT SETTINGS". When the user selects "TRANSPARENT PRINT SETTINGS" (not shown) in the "APPLIED PRINT SETTINGS", the CPU 101 displays "APPLIED PRINT SETTINGS" screen shown in FIG. 4 at the display 111.

(FIG. 3(*b*))

FIG. 3(*b*) is a schematic view showing an example of the screen displayed on the display 111 when B104 is selected by the user. In a state in which the screen shown in FIG. 3(*b*) is displayed, the user can effect settings for the sheet to be used for the printing.

B201 represents a pull-down menu for changing a portion at which the sheet is stored. The user can set the portion at which the sheet used for the printing by selecting B201. B202 represents a selectably displayed list for changing the size of the sheet used for the printing. In this list portion, the regular sizes are selectably displayed. In the screen shown in FIG. 3(*b*), the user can change the size of the sheet stored in the "CASSETTE 1". In the screen shown in FIG. 3(*b*), the size of the sheet used for the printing is A4 size. In such a setting screen, the set size information of the sheet used for the printing is stored in the RAM 102. B203 represents a button for changing the margin. The user can change the image formable area of the sheet by changing the margin settings. B204 represents a button for adding the sheet size displayed in the list B202. As a result, the sheet size having a low use frequency can be selected from the list B202. B205 represents a button for setting the sheet size in the case where the size of the sheet used for the printing is the custom size.

In a station which the information of the sheet used for the printing is set, the user can reflect the setting information by selecting a button B206 (OK button). In the case where the user selects the button B206 (OK button), the CPU 101 displays the screen shown in FIG. 3(*a*) at the display 111.

Further, the user can destruct the setting information by selecting a button B207 (cancel button). In the case where the user selects the button B207 (cancel button), the CPU 101 destructs the information set in the screen shown in FIG. 3(*b*) and displays the screen shown in FIG. 3(*a*) at the display 111.

(FIG. 4)

Figure 4:
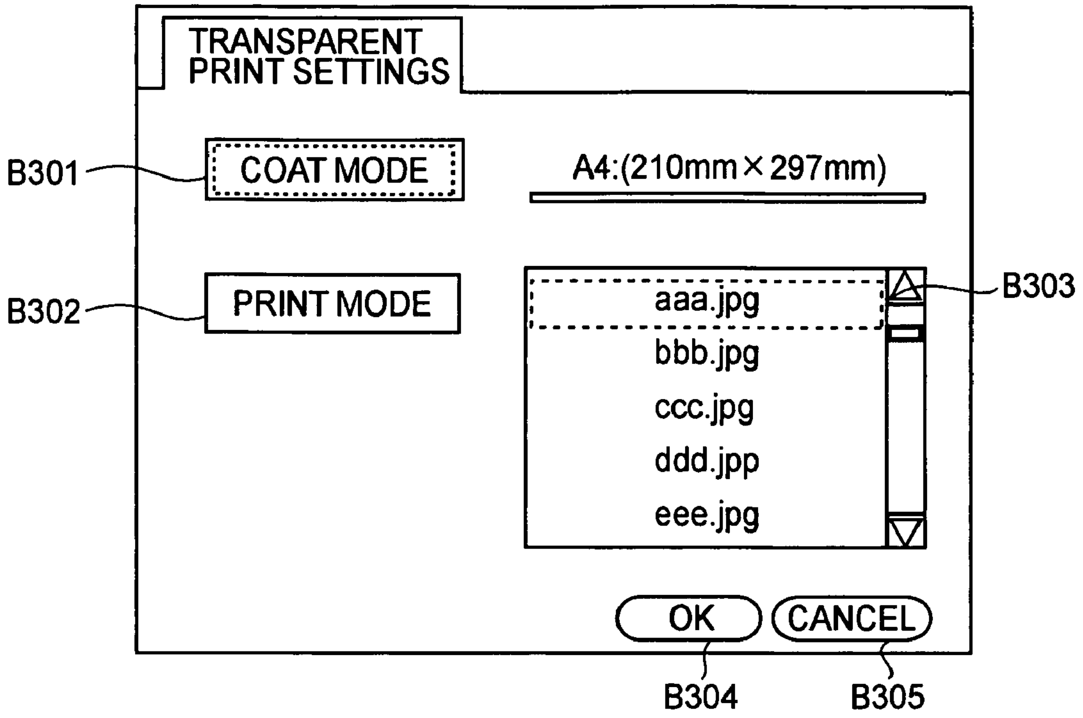

FIG. 4 is a schematic view showing an example of the screen displayed at the display 111 when the user selects the "TRANSPARENT PRINT SETTINGS" after selecting the button B104. In the state in which the screen shown in FIG. 4 is displayed, the user can set a transparent printing mode as transparent print setting information.

The transparent printing mode is classified into a "transparent coat mode" for applying the transparent toner on the entire image formable area of the sheet and a "transparent print mode" for applying the transparent image on a portion of the sheet corresponding to the designated image data. The user can select the "transparent coat mode" by selecting B301. Further, the user can select the "transparent print mode" by selecting B302. The user can set the transparent printing mode by selecting B301 or B302. In the screen shown in FIG. 4, the "transparent coat mode" is selected. In the case where B301 is selected, the entire image formable area of the sheet displayed at a right-hand portion of B301 is set to be coated with the transparent toner. The entire image formable area of the shed displayed at the right-hand portion is changed correspondingly to the sheet size set in the screen shown in FIG. 3(*b*). Further, in the case where the user selects the "TRANSPARENT PRINT MODE" (B302), it is necessary to designate the image data used for forming the image by using the transparent toner. Therefore, when B302 is selected, the user selects the sheet used for the transparent image formation from a list displayed at a portion B303. At the portion B303, the image data stored in the HDD 104 is selectably displayed. Hereinafter, information on image data necessary in the transparent printing mode and the transparent print mode is referred to as the transparent print information.

In a state in which the transparent print information is set as described above, the user can store the transparent print information in the RAM 102 by selecting a button B304 (OK button). In the case where the user selects the button B304 (OK button), the CPU 101 displays the screen shown in FIG. 3(*a*) at the display 111.

Further, the user can destruct the transparent print information by selecting a button B305 (cancel button). In the case where the user selects the button B305 (cancel button), the CPU 101 destructs the information set in the screen shown in FIG. 4 and displays the screen shown in FIG. 3(*a*) at the display 111.

In this manner, the transparent print information and the setting information on the sheet size are stored in the RAM 102 for settings. On the basis of the transparent print information and the setting information which have been set by using the above-described screen, the CPU 101 controls the respective portions of the MFP 100.

(Relationship Between Amount per Unit Area and Glossiness of Toner Image Formed on Sheet)

Figure 5:
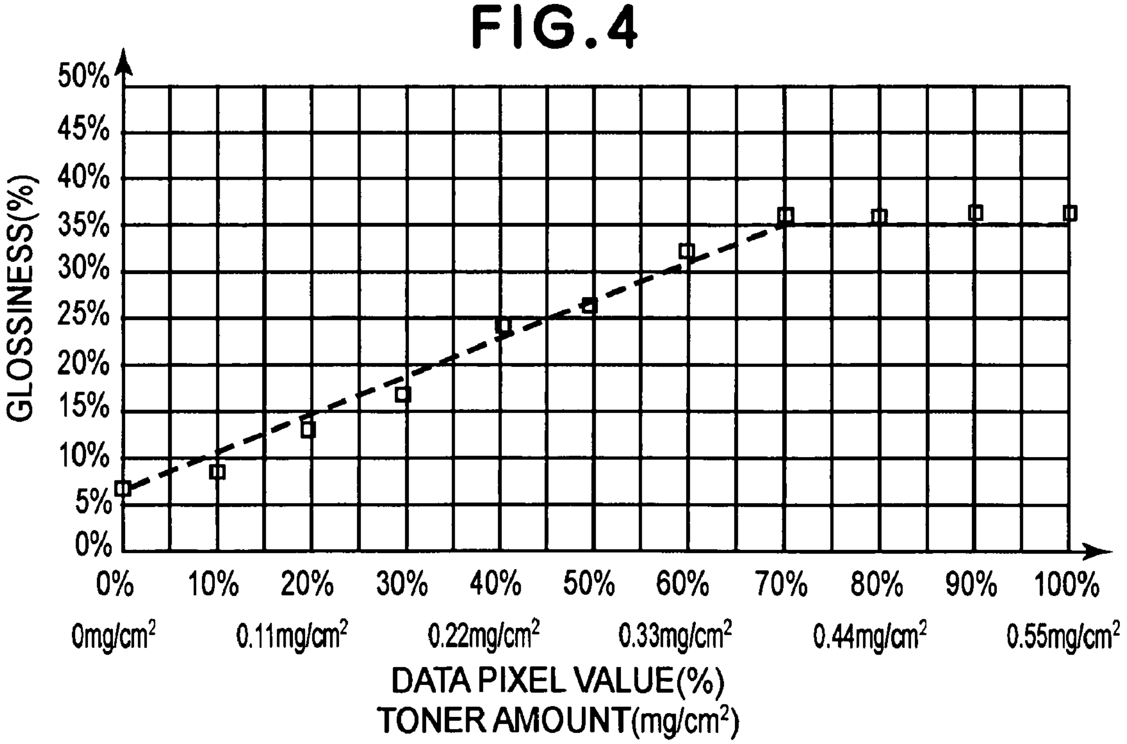
FIG. 5 is a graph showing a relationship between a toner amount per unit area and a glossiness in the case of using the MFP in the embodiment of the present invention.

FIG. 5 is a graph showing a relationship between the toner amount per unit area and the glossiness in the case where the toner image is formed by using the above-described MFP. In this embodiment, when a pixel value of data of 255 (corresponding to 100%) in terms of 8 bit representation is inputted, the printer portion applies the toner onto corresponding portion of the sheet in an amount per unit area of 0.55 mg/cm$^2$. In this case, the transparent toner is only required to be applied or not applied onto the designated area. For that reason, the image data, used for forming the image with the transparent toner, to be inputted into the image forming portion is two-valued data. The image data for forming the color images is represented by 8 bit representation for each of the colors.

Incidentally, with respect to the graph shown in FIG. 5, as the sheet on which the image is formed, matte coated paper ("U-Light" (trade name), mfd. by Nippon Paper Industries Co., Ltd.; basis weight=157 g/m$^2$) was used. As described above, when the amount per unit area of the transparent toner applied onto the sheet is increased, the gloss is changed in proportion to the toner amount. Even when the transparent toner is applied onto the sheet, the transparent toner after being fixed is colorless and transparent, so that an optical density is little changed. When the sheet surface is sufficiently coated with the toner (60% to 70% in this embodiment), the gloss is not changed even when the apparatus of the transparent toner is increased. For that reason, when instructions to apply the transparent toner are provided, i.e., when a value of transparent image data used for forming the transparent toner image is 1, the printer portion applies the transparent toner onto a corresponding portion of the sheet in an amount of 0.33 mg/cm$^2$. When the transparent image data value is 0, the printer portion does not apply the transparent toner onto the corresponding portion of the sheet.

(Operation of Image Forming Apparatus)

An operation for controlling the image forming apparatus by the CPU on the basis of the above-described transparent print information and setting information will be described with reference to schematic views.

(Transparent Coat Mode)

Figure 6A:
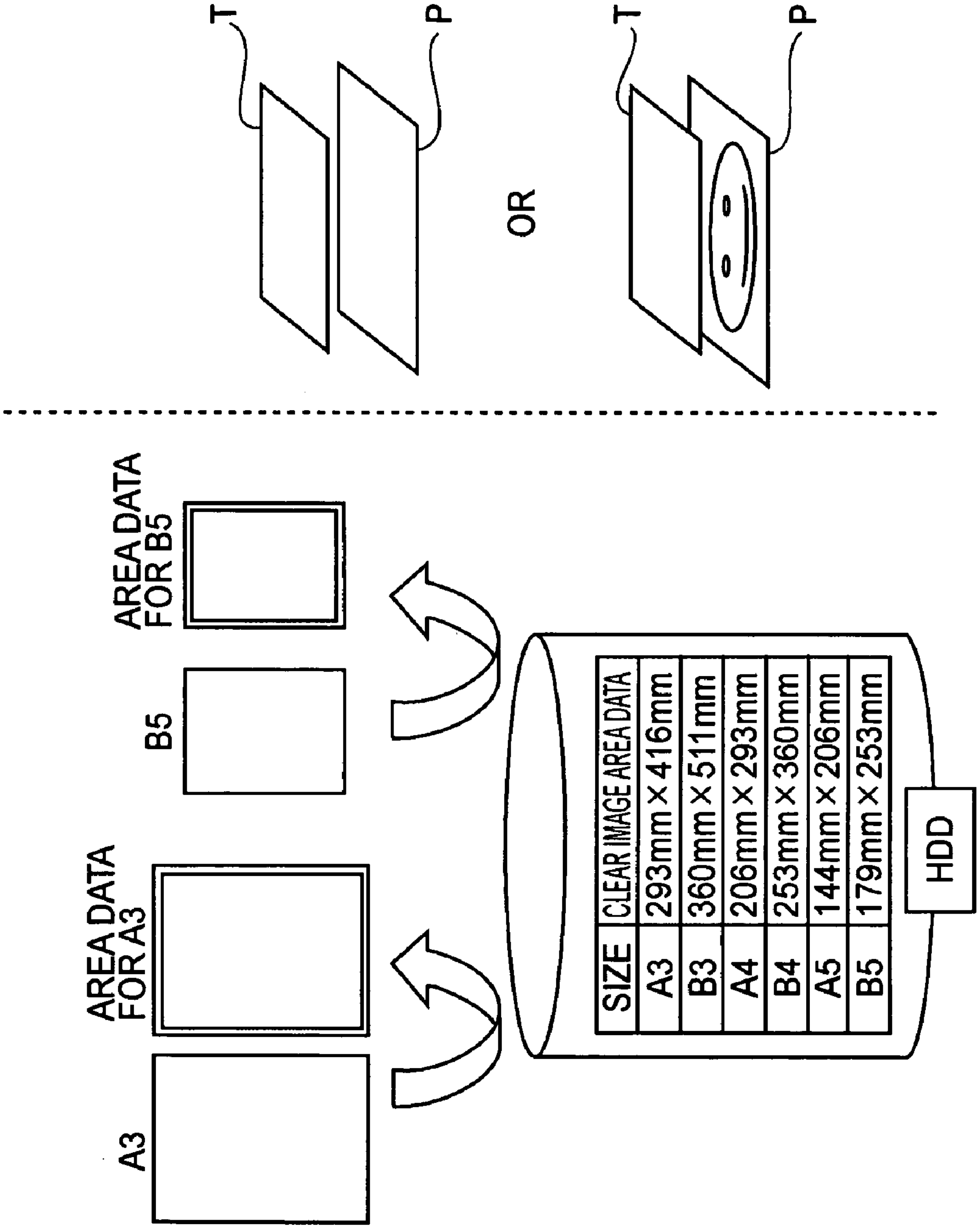
FIGS. 6(*a*) and 6(*b*) are schematic views each for illustrating an image to be processed by the MFP in the embodiment of the present invention and a print to be outputted.
Figure 6B:
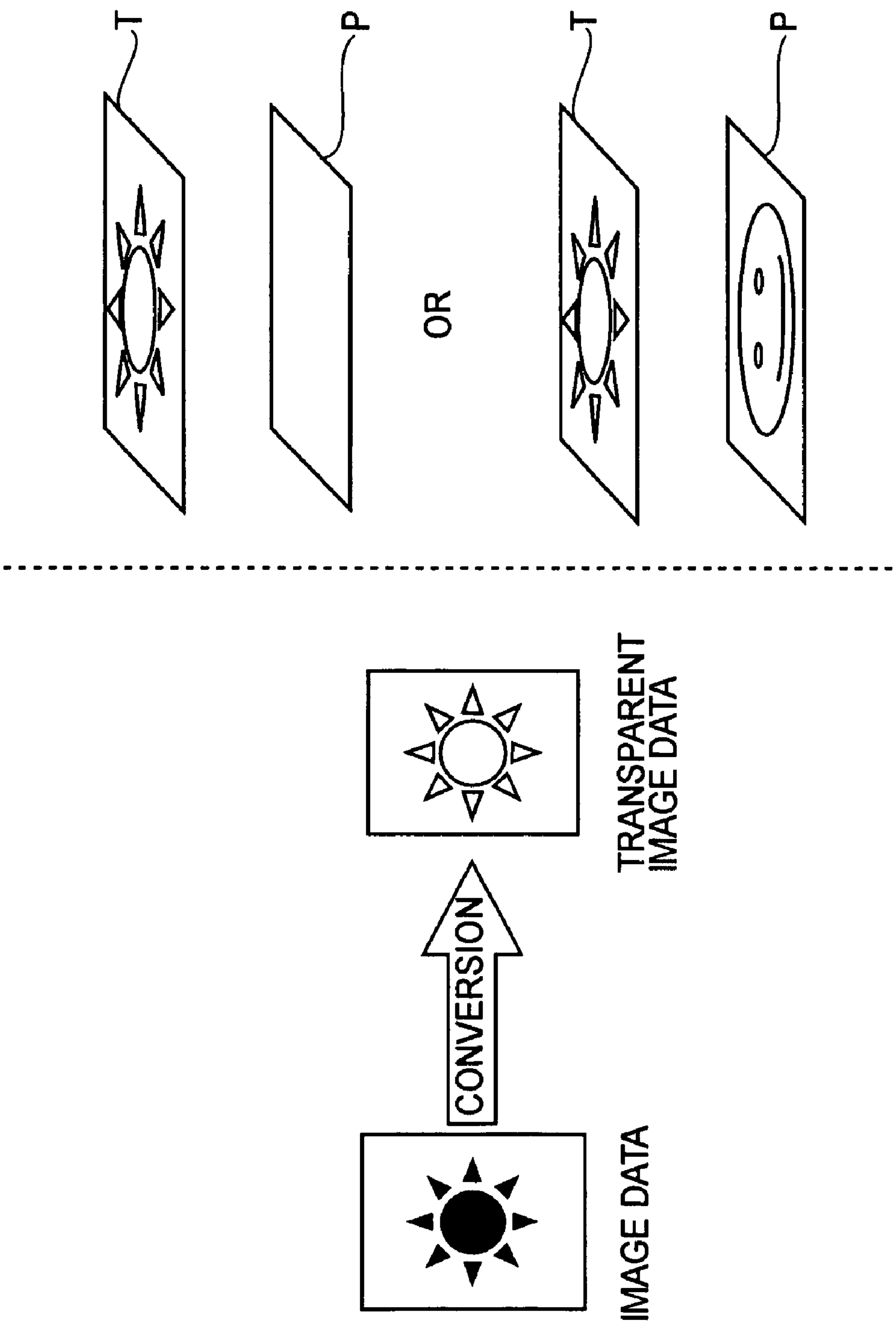

Processing executed by the CPU 101 as the control means when the transparent coat mode is executed will be described with reference to the schematic view. FIG. 6(*a*) is the schematic view for illustrating the processing executed by the CPU 101 when the transparent coat mode is executed. In this embodiment, the printer portion can form the color images and the transparent image on the sheet by using the color toners and the transparent toner. In this embodiment, the transparent image is formed on the sheet by the printer portion.

An example in which the transparent image is fixed on the sheet, on which the color images have been formed, set in the "CASSETTE 1" will be described. Incidentally, the transparent image may also be fixed on the sheet, without forming the color images, on which the color images have not been formed. Further, the transparent image may also be formed on the sheet, on which the color images have already been fixed, set in the manual feeding tray 14.

As described above, in the HDD 104, the image data for applying the transparent toner onto the entire image formable area of the sheet depending on the sheet size is stored. The CPU 101 obtains the image data for applying the transparent toner onto the entire image formable area of the corresponding sheet on the basis of the setting information stored in the RAM 102. In this case, the image data is stored in the HDD 104 in a state in which the image data is associated with the sheet size. In the RAM 102, a table for associating the sheet size with the image data may also be stored. As a result, the CPU 101 as the control means stores the image data for coating the entire image formable area of an A3-sized sheet in the RAM 102 when the size of the sheet used for the image formation is A3. Further, the CPU 101 stores the image data for coating the entire image formable area of a B5-sized sheet in the RAM 102 when the size of the sheet used for the image formation is B5. The CPU 101 sends the image data stored in the RAM 102 to the printer portion as the image forming means so that the printer portion forms the transparent image on the sheet. The image data, used for coating the entire image formable area of the sheet with the transparent toner depending on the sheet size, which is stored in the HDD 104 in advance is transparent image data represented as the two-valued data. That is, the HDD as the storing means stores a plurality of image data including image data for forming the transparent image on the entire image formable area of the sheet having a first size (e.g., A4 size) by using the transparent toner and including image data for forming the transparent image on the entire image formable area of the sheet having a second size (e.g., B4 size) different from the first size by using the transparent toner. In other words, the HDD as the storing means stores the image data, for forming the transparent image on the entire image formable area of the sheet, for each of a plurality of predetermined sheets different in size.

(Transparent Print Mode)

Processing executed by the CPU 101 as the control means when the transparent print mode is executed will be described with reference to the schematic view. FIG. 6(*b*) is the schematic view for illustrating the processing executed by the CPU 101 when the transparent print mode is executed.

In the transparent print mode, the area for forming the transparent toner image is designated by using the image data stored in the HDD 104. This image data is, as described above, the image data inputted from the scanner portion 116 or the PC 300 etc. For that reason, most of the image data is full-color image data. However, in order to form the transparent toner image, the transparent image data represented as the two-valued data may be used. Therefore, the CPU 101 converts the image data stored in the HDD 104 into the transparent image data represented as the two-valued data. The CPU 101 converts the image data into 0 (bit) in the case where all the pixel values for RGB are 0 (8 bit) and into 1 (bit) in the case where either one of the pixel values for RGB is 1 or more. The conversion method for converting the image data into the transparent image data is not limited to the above method. Further, the transparent image data converted from the image data may also be stored in the HDD 104. In this way, by storing the transparent image data after the conversion in the HDD 104, the CPU 101 is not required to perform the conversion processing every execution of the transparent print mode. However, the transparent image data after the conversion is stored, so that the storage capacity for storing other data is decreased.

When the "TRANSPARENT PRINT MODE" is selected as the transparent print information, the CPU 101 converts the designated image data stored in the HDD 104 into the transparent image data and then stores the converted transparent image data in the RAM 102. By sending the image data to the printer portion 115 as the image forming means, it is possible to form the transparent image on the sheet.

(Operation Explanation of MFP Along Flow Chart)

Figure 7A:
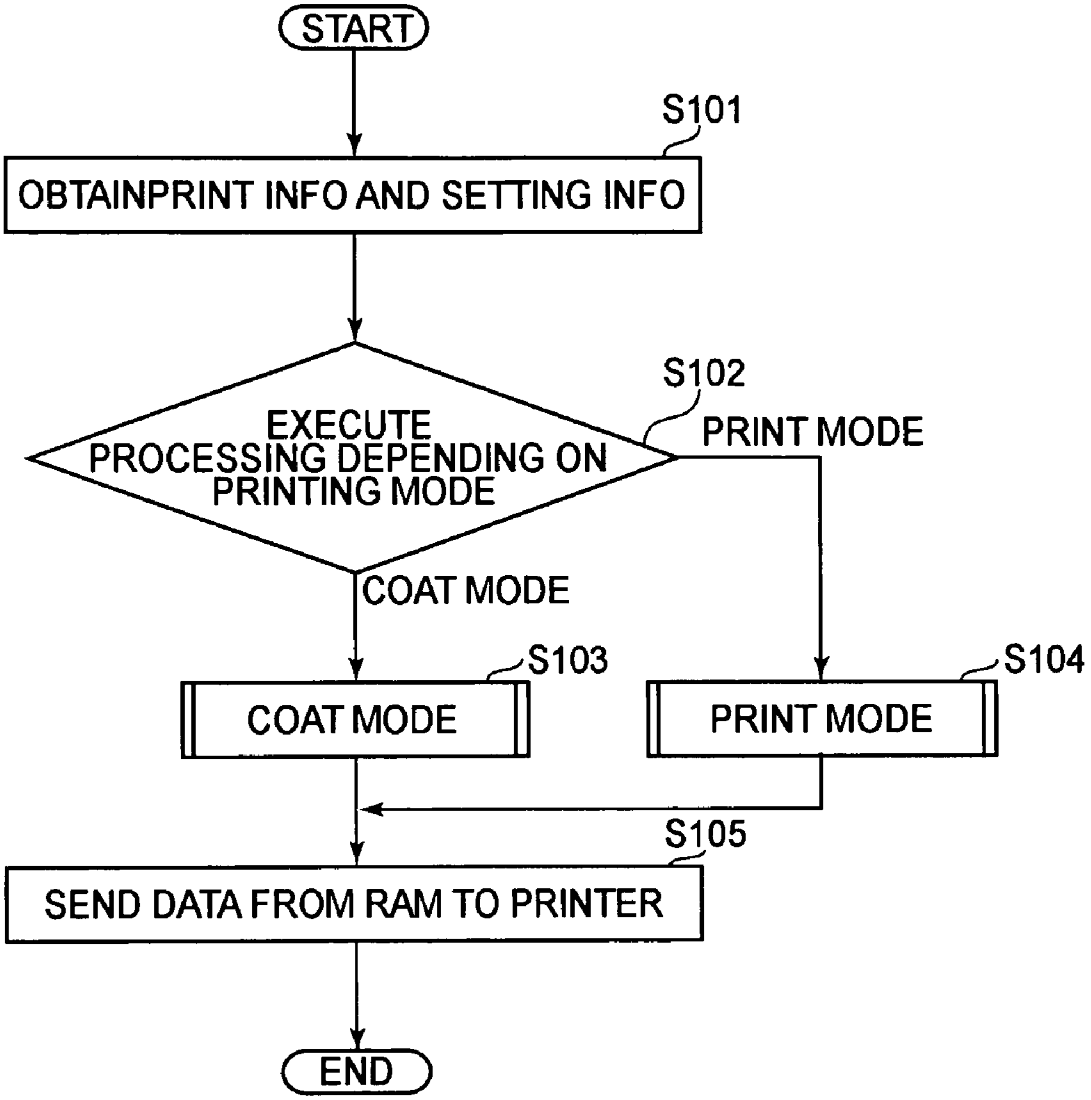
FIGS. 7(*a*), 7(*b*) and 7(*c*) are flow charts each showing a procedure for controlling an operation of the MFP in the embodiment of the present invention.
Figure 7B:
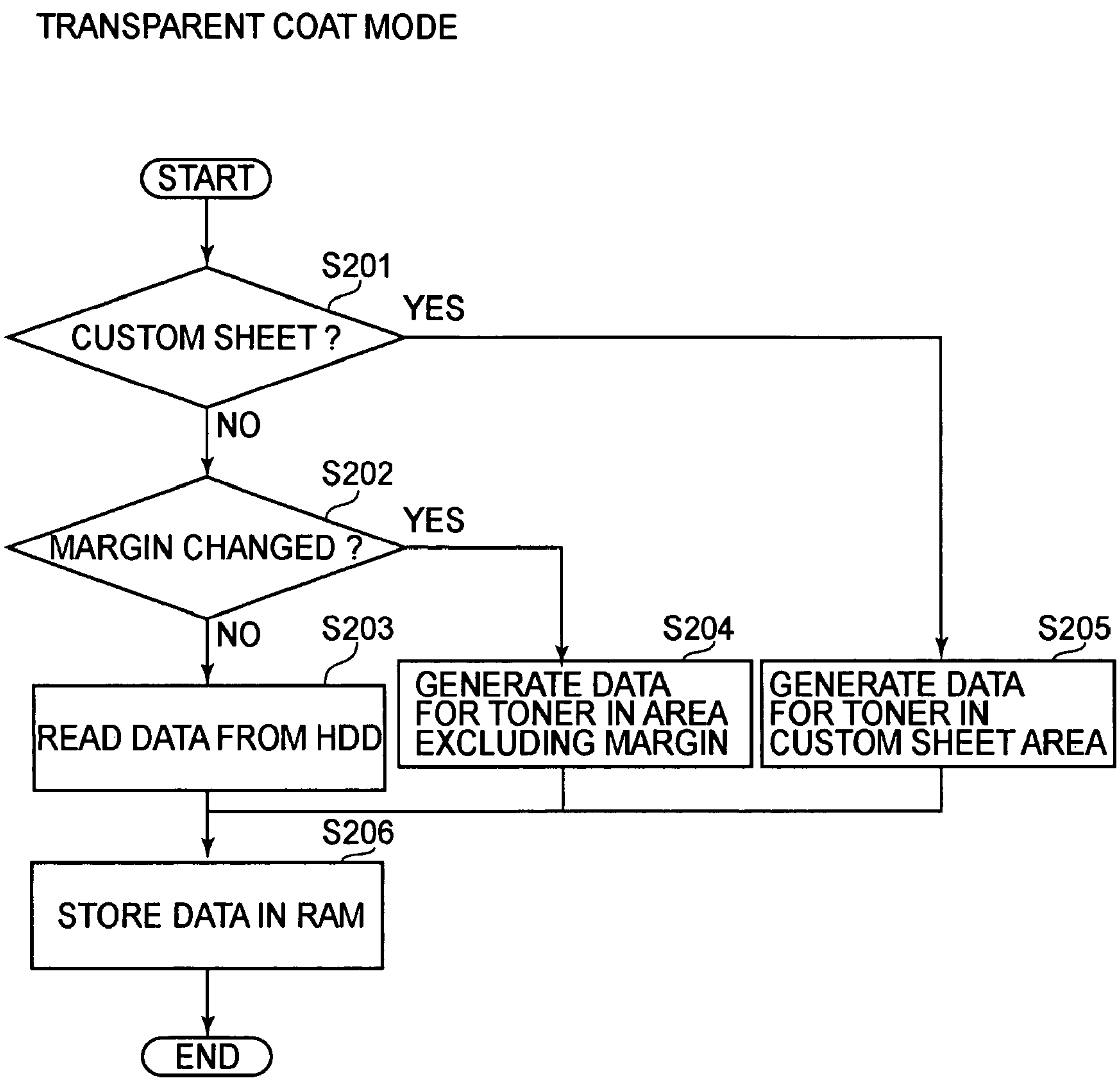
Figure 7C:
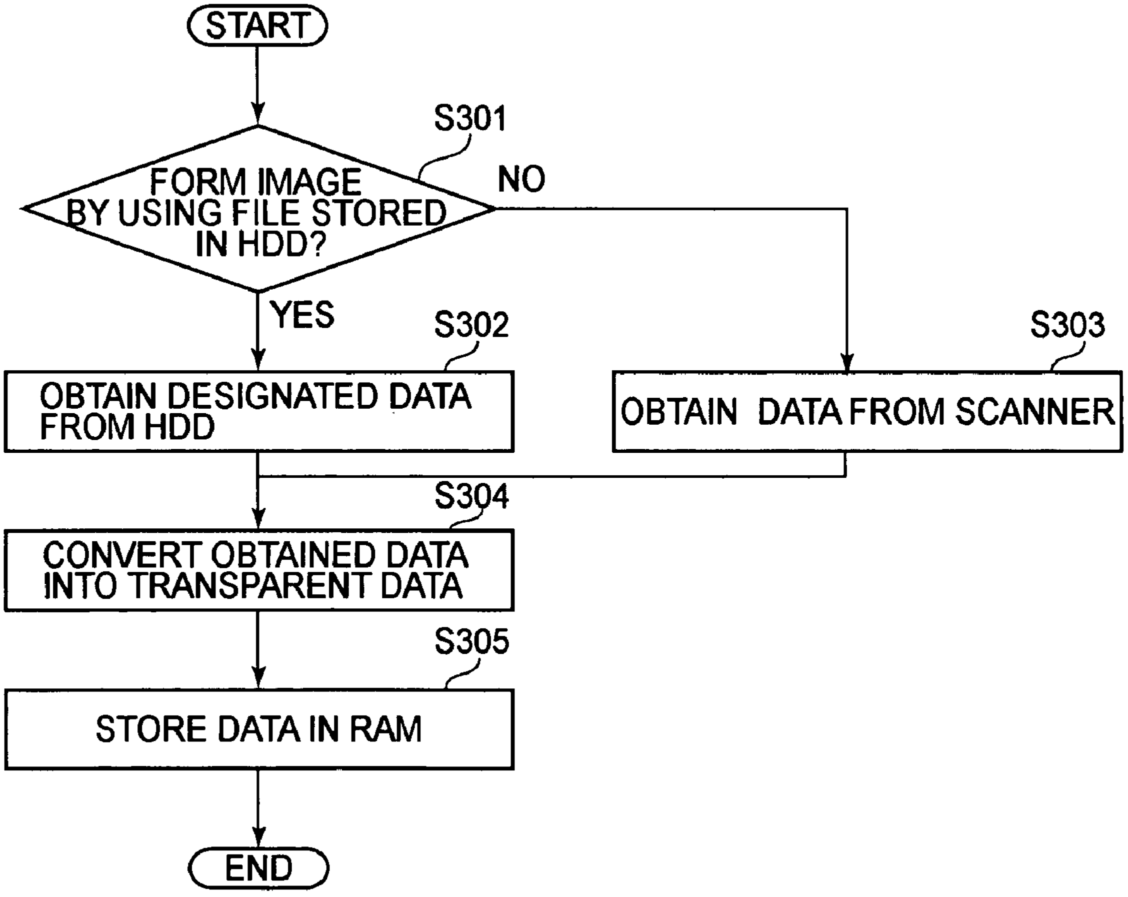

On the basis of the information set in the above-described setting screen, the image forming apparatus operates as follows. FIGS. 7(*a*), 7(*b*) and 7(*c*) are flow charts each showing a procedure of image processing. In this embodiment, the image processing as a characterized processing is executed in the CPU 101 of the MFP 100. An operation for processing the image, by the CPU 101 as the control means, in accordance with a program stored in the ROM 103 will be described. The transparent print settings (the transparent printing means and the designated image data) and the setting information (the size of the sheet used for the printing) are stored in the RAM 102. Specifically, the CPU 101 as display instruction means displays the screens shown in FIGS. 3(*a*), 3(*b*) and 4 at the display 111 in order that the user sets the transparent print information and the setting information. Further, in accordance with the input from the operation panel 112, the CPU 101 changes the displayed screen and stores the set information in the RAM 102.

Referring to FIG. 7(*a*), S101 represents a step for obtaining the transparent print information and the setting information. The CPU 101 as an obtaining means obtains the transparent print information and the setting information which are stored in the RAM 102.

S102 represents a step for executing processing depending on the transparent printing mode obtained in the step S101. The CPU 101 as the control means executes processing in a step S103 in the case where the transparent printing mode obtained in the step S101 is the "TRANSPARENT COAT MODE". Further, the CPU 101 executes processing in a step S104 in the case where the transparent printing mode obtained in the step S101 is the "TRANSPARENT PRINT MODE".

The step S103 is performed when the "TRANSPARENT COAT MODE" is selected. The CPU 101 executes the processing in accordance with the flow chart of FIG. 7(*b*) described later in detail.

The step S104 is performed when the "TRANSPARENT PRINT MODE" is selected. The CPU 101 executes the processing in accordance with the flow chart of FIG. 7(*c*) described later in detail.

S105 represents a step for forming the transparent image on the sheet on the basis of the transparent image data stored in the RAM 104 in the step S103 or S104. The CPU 101 sends the transparent image data stored in the RAM 102 to the printer portion 115. The printer portion 115 which has received the transparent image data forms the transparent image corresponding to the received transparent image data on the sheet having the designated size. That is, the CPU 101 as the control means controls the printer portion 115 as the image forming means so that the transparent image on the basis of the image data selected by the CPU 101 as a selection means is formed on the sheet. In other words, in the case where the image data for applying the transparent toner onto the entire image formable area of the sheet having the size obtained by the CPU 101 as the obtaining means is stored in the HDD 104 as the storing means, the CPU 101 as the control means controls the printer portion as the image forming means so that the transparent image on the basis of the image data is formed on the sheet.

Then, defined processing S103 and defined processing S104 will be described more specifically.

(Defined Processing: Operation in Transparent Coat Mode)

The defined processing S103 will be described in detail.

S201 represents a step for changing processing depending on the sheet size used for image formation, such as the custom size or the regular size, obtained in the step S101. The CPU 101 executes processing in step S205 when the sheet size used for the image formation is the custom size. Further, the CPU 101 executes processing in a step S202 when the sheet size is the regular size. That is, the CPU 101 as a discrimination means discriminates whether or not the image data corresponding to the sheet having the size obtained in the step S101 is stored in the HDD 104 as the storing means.

S202 represents a step for changing processing depending on whether or not a margin of the sheet having the regular size used for the image formation obtained in the step S101 is changed. The CPU 101 executes the processing in a step S204 when the margin of the sheet used for the image formation is changed. Further, the CPU 101 executes the processing in a step S203 when the margin of the sheet used for the image formation is not changed.

In the step S203, the transparent image data corresponding to the size of the sheet used for the image formation is selected. The CPU 101 loads the image data, for applying the transparent toner onto the entire image formable area of the sheet used for the image formation, from the HDD 104 by using a table in which the relationship between the sheet size and the transparent image data is stored. In other words, the CPU 101 as the selection means selects image data (first image data) corresponding to A4 size (first size) stored in the HDD as the storing means when the sheet size obtained by the CPU 101 as the obtaining means is the A4 size (first size). Further, the CPU 101 as the selection means selects image data (second image data) corresponding to B5 size (second size) stored in the HDD as the storing means when the sheet size obtained by the CPU 101 as the obtaining means is the B5 size (second size).

The step S204 is performed when the setting of the sheet margin is changed from a predetermined value. The CPU 101 generates the transparent image data on the basis of the changed margin.

In the step S205, the transparent image data for forming the transparent image on the entire image formable area of the sheet having the set custom size is formed. The CPU 101 generates the transparent image data for forming the transparent image on the entire image formable area of the sheet having the custom size obtained in the step S101.

S206 represents a step for storing, in the RAM 102, the transparent image data designated in the step S203, S204 or S205. The CPU 101 stores, in the RAM 102, the transparent image data read from the HDD in the step S203 or the transparent image data generated in the step S204 or S205.

(Defined Processing: Operation in Transparent Print Mode)

The defined processing S104 will be described in detail.

S301 represents a step for externally obtaining the image data in the case where the image data necessary to partly form the transparent image in the transparent print mode is not stored in the HDD 104. When the image data used for forming the transparent image is not stored in the HDD 104, the CPU 101 executes processing in a step S303. Further, when the image data used for forming the transparent image is stored in the HDD 104, the CPU 101 executes processing in a step S302.

In the step S302, when the image data used for forming the transparent image is stored in the HDD 104, the stored image data is obtained. The CPU 101 reads, from the HDD 104, the image data which is designated based on the transparent print information and is used for partly forming the transparent image.

In the step S303, when the image data used for forming the transparent image is not stored in the HDD 104, the image data is obtained from the scanner portion. The CPU 101 gives the scanner portion instructions to read the image formed on the original set on the original carriage and send the resultant image data to the CPU 101. As a result, the CPU 101 obtains the image data sent from the scanner portion.

S304 represents a step for converting the image data into the transparent image data. The CPU 101 converts the image data obtained in the step S302 or S303 into the transparent image data.

S305 represents a step for storing the transparent image data, converted in the step S304, in the RAM 102. The CPU 101 stores the transparent image data in the RAM 102.

The CPU 101 as the control means operates based on the flow chart described above, so that the gloss of the sheet can be increased by coating the entire image formable area of the sheet with the transparent toner irrespective of the sheet size when the "TRANSPARENT COAT MODE" is selected.

In this embodiment, the operation for forming the transparent toner image on the sheet on which the color images are not fixed or on the sheet on which the color images are fixed is described above. Therefore, this embodiment is also applicable to the image forming apparatus including only the transparent image forming station.

Embodiment 2

In Embodiment 1, the example in which the transparent image is formed on the sheet on which the color images have been fixed is described. The MFP 100 is also capable of fixing the color toners and the transparent toner collectively in the sheet. For that reason, in this embodiment, the MFP provided with a "five-color mode" in which the images of the color toners and the transparent toner and transferred onto the sheet and then are collectively fixed on the sheet will be described.

In this embodiment, the schematic structure of the image forming apparatus is identical to that in Embodiment 1. For that reason, the portions or means described also in Embodiment 1 are represented by the same reference numerals or symbols, thus being omitted from redundant description.

(Screen Displayed at Display)

Figure 8:
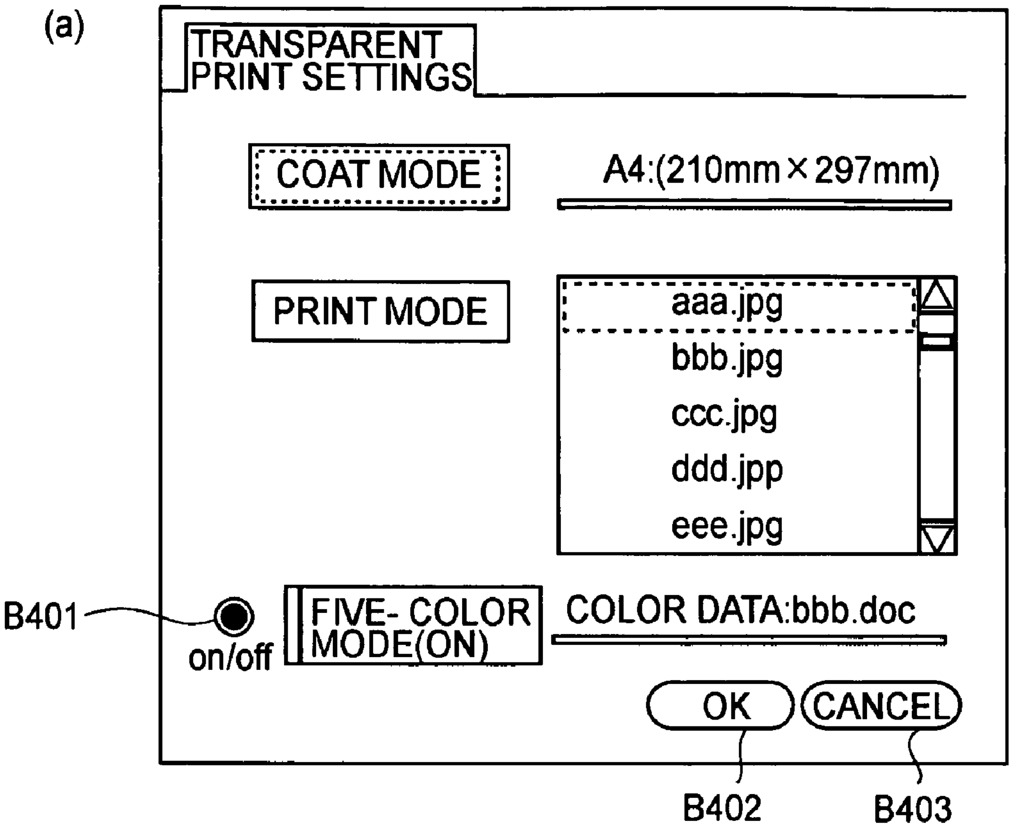
FIGS. 8(*a*) and 8(*b*) are schematic views each showing an example of a screen displayed on a display of an MFP in another embodiment of the present invention.
Figure 8:
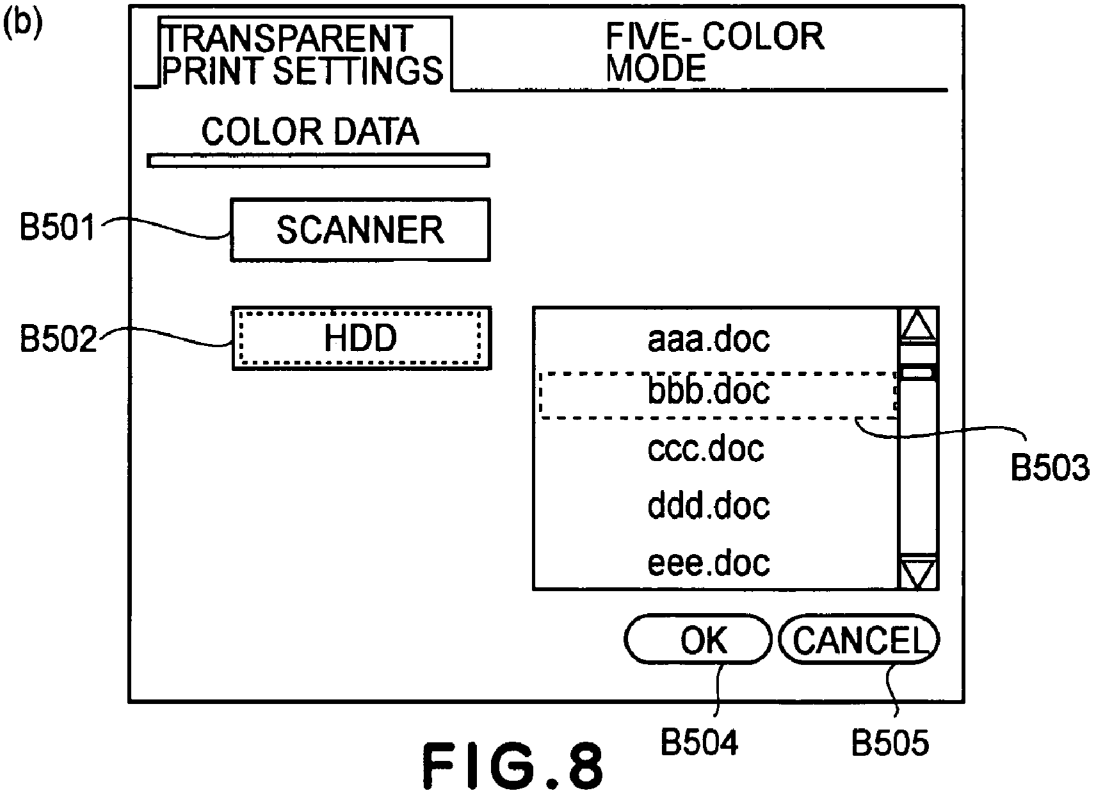

FIG. 8(*a*) is a schematic view showing a screen displayed at the display of the MFP 100. B401 represents a button for selecting the "FIVE-COLOR MODE". When the button B401 is selected, the CPU 101 displays a screen shown in FIG. 8(*b*) at the display. As a result, image data for forming the color images on the sheet can be designated. The user selects "ON" or "OFF" of the "FIVE-COLOR MODE" and sets the transparent print information including the image data for forming the color images when "ON" is selected. Thereafter, the user can reflect the set information by selecting a button B402 (OK button). Further, the user can destruct the set transparent print information by selecting a button B403 (cancel button). In the screen shown in FIG. 8(*a*), the "FIVE-COLOR MODE" and the "TRANSPARENT COAT MODE" are selected.

FIG. 8(*b*) shows a screen displayed at the display when the button B401 is selected. The user can designate the image data used for forming the color images by operating the screen on the basis of display contents. The image data used for forming the color images may also be stored in the HDD 104 or may also be read from the original through the scanner portion. In the case where the image is intended to be formed by using the image data read from the scanner portion, the user selects B501. Further, in the case where the image is intended to be formed by using the image data stored in the HDD 104, the user selects B502. The image data stored in the HDD is displayed as a list B503. The user can select the image data for the image intended to be formed from the list. In the screen shown in FIG. 8(*b*), setting is made so that the color images are formed on the sheet by using the image data converted from "bbb.doc" stored in the HDD. The user can reflect the information by selecting a button B504 (OK button). Further, the user can destruct the set transparent print information by selecting a button B505 (cancel button). When the button B504 or B505 is selected, the CPU 101 displays the screen shown in FIG. 8(*a*) at the display.

(Schematic View for Illustrating Fine-Color Mode)

Figure 9:
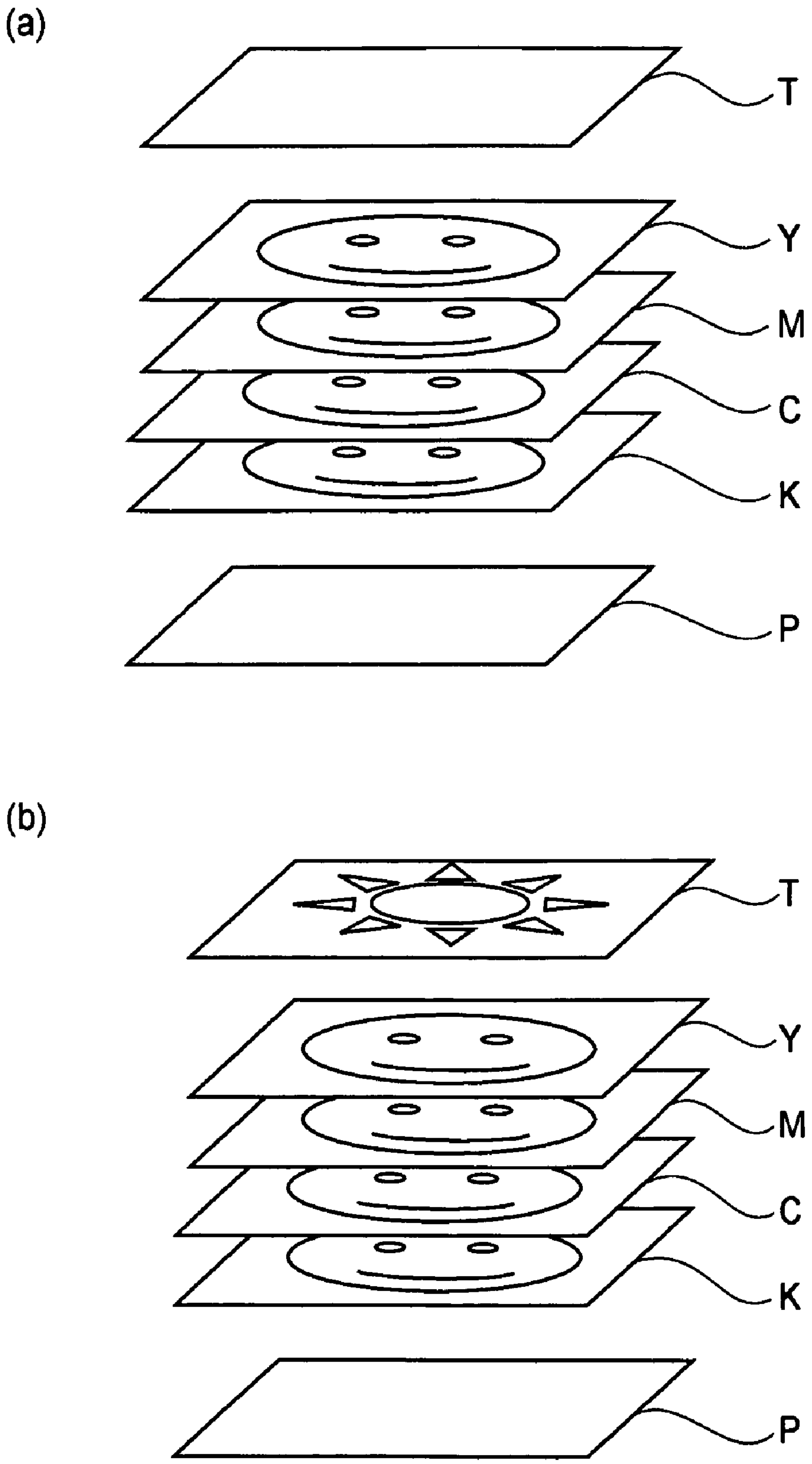
FIGS. 9(*a*) and 9(*b*) are schematic views for illustrating an image to be processed by the MFP in the aforementioned another embodiment of the present invention.

FIGS. 9(*a*) and 9(*b*) are schematic views for illustrating the image formed on the sheet when the "FIVE-COLOR MODE" is selected.

The image formed on the sheet when the "FIVE-COLOR MODE" and the "TRANSPARENT COAT MODE" are selected will be described with reference to the schematic view of FIG. 9(*a*). A reference symbol P represents a sheet on which the image is to be formed. On this sheet, the image is formed by using the color toners on the basis of the image data. The MFP forms an image K on the sheet by using black toner, an image C on the image K by using cyan toner, an image M on the image C by using magenta toner, and an image Y on the image M by using yellow toner. Further, the MFP forms a transparent image on the entire image formable area of the sheet so as to coat the color images with the transparent toner. Similarly as in Embodiment 1, the MFP 100 forms the image T on the entire image formable area of the sheet by using the image data for coating the entire image formable area of the sheet with the transparent toner when the sheet size is the regular size or by using the image data generated correspondingly to the sheet size by the CPU 101 when the sheet size is the custom size.

The image formed on the sheet when the "FIVE-COLOR MODE" and the "TRANSPARENT COAT MODE" are selected will be described with reference to the schematic view of FIG. 9(*b*). The MFP forms an image K on the sheet by using black toner, an image C on the image K by using cyan toner, an image M on the image C by using magenta toner, and an image Y on the image M by using yellow toner. Further, the MFP forms the transparent image on the basis of transparent image data designated so as to coat the color images formed on the sheet. The image formed on the sheet when the five-color mode is selected is described above with reference to the schematic views.

(Operation Explanation of MFP Along Flow Chart)

Figure 10:
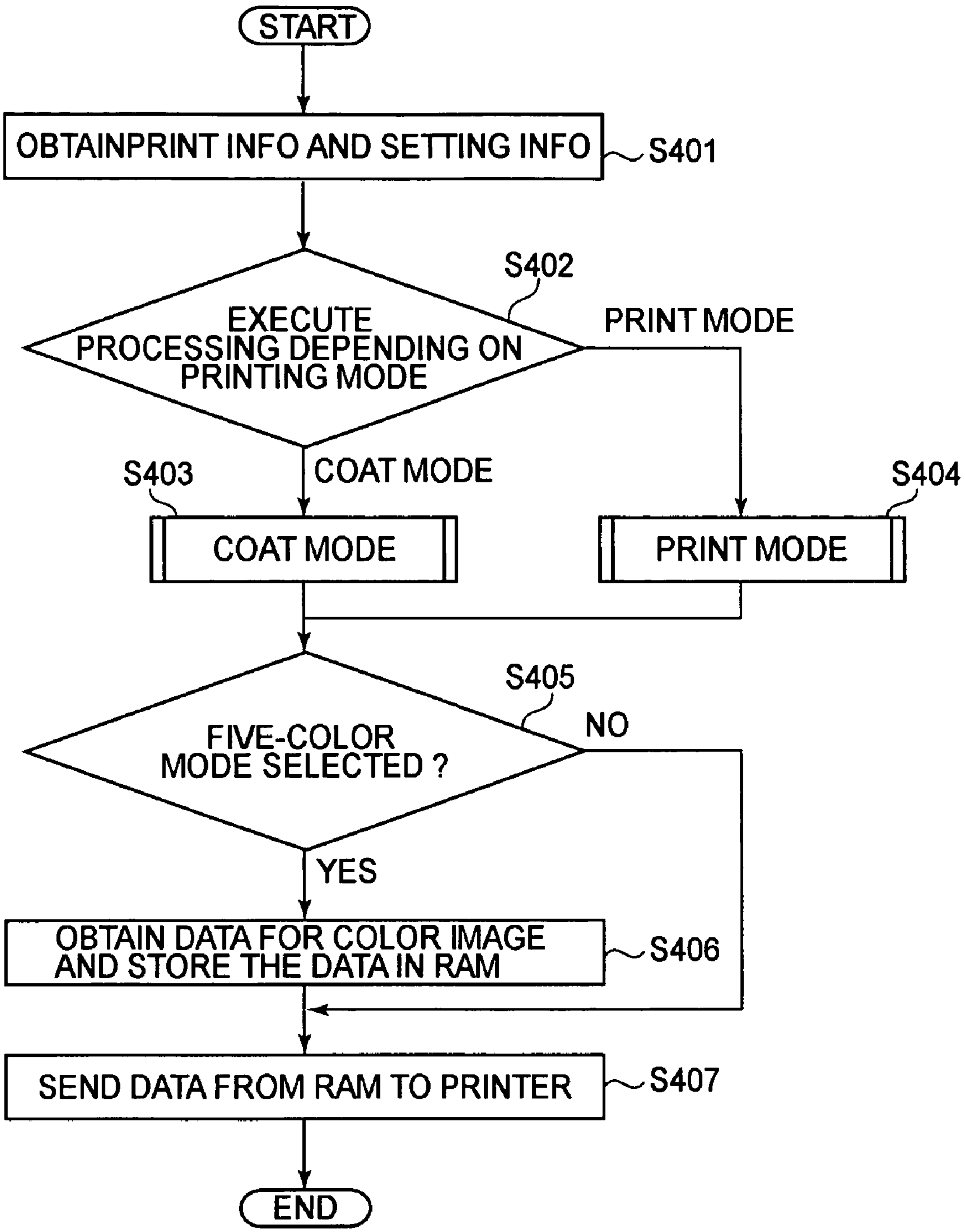
FIG. 10 is a flow chart showing a procedure for controlling an operation of the MFP in the aforementioned another embodiment of the present invention.

On the basis of the information set in the above-described setting screen, the image forming apparatus operates as follows. FIG. 10 is a flow chart showing a procedure of image processing. In this embodiment, the image processing as a characterized processing is executed in the CPU 101 of the MFP 100. An operation for processing the image, by the CPU 101 as the control means, in accordance with a program stored in the ROM 103 will be described. The transparent print settings (the transparent printing means and the designated image data) and the setting information (the size of the sheet used for the printing) are stored in the RAM 102.

Steps S401 to S404 are equal to the steps S101 to S104 in Embodiment 1, thus being omitted from description.

S405 represents a step for changing processing depending on a selected mode. The CPU 101 executes processing in a step S406 in the case where the "FIVE-COLOR MODE" is selected. Further, the CPU 101 executes processing in a step S407 in the case where the "FIVE-COLOR MODE" is not selected.

In the step S406, color image data for forming the color images on the sheet is obtained. The CPU 101 obtains the image data, for forming the color images on the sheet in the "FIVE-COLOR MODE", from a designated portion. In this embodiment, the image data can be obtained from the HDD 104 or the scanner portion 116. In the case of using the image data stored in the HDD 104, the CPU 101 obtains the image data from the HDD 104 and stores the image data in the RAM 102. In the case of obtaining the image data from the scanner portion 116, the CPU 101 sends, to the scanner portion 116, control instructions to read the image data from the original set on the original carriage. The scanner portion 116 which has received the control instructions stores the image data, based on the original placed on the original carriage, in the RAM 102.

In the step S407, the image is formed on the sheet on the basis of the transparent image data and the image data which are stored in the RAM 102 when the "FIVE-COLOR MODE" is selected and the image is formed on the sheet on the basis of the transparent image data stored in the RAM 102 when the "FIVE-COLOR MODE" is not selected. The CPU 101 sends the image data stored in the RAM 102 to the printer portion 115. The printer portion 115 which has received the image data forms the image corresponding to the image data on the sheet having the size designated based on the setting information.

In this manner, when the "FIVE-COLOR MODE" is selected, the MFP 100 forms the images on the sheet by using the color toners and the transparent toner.

Embodiment 3

In Embodiment 1 and Embodiment 2, the image forming apparatus fixed the toner image, formed on the sheet, on the sheet by using a so-called high-temperature separation type. In the present invention, the fixing device of the high-temperature separation type refers to such a fixing device that the image formed on the sheet is heated for the fixation and thereafter is separated. In the present invention, the sheet is coated with the transparent toner in order to enhance the gloss at the surface of the image formed on the sheet. In this embodiment, a fixing device of a cooling separation type is used for the image formed on the sheet. In the present invention, the fixing device of the cooling separation type refers to such a fixing device that the image formed on the sheet is heated and then cooled and thereafter is separated. The cooling separation-type fixing device will be described below more specifically.

(Schematic Structure of Image Forming Apparatus)

In this embodiment, to the MFP 100 as the image forming apparatus, auxiliary device 118 is connected. The auxiliary device 118 includes a cooling separation-type fixing device 20 as a glossing means. As described above, the auxiliary device 118 communicates with the CPU 101 through an inter-device communication I/F 113 in accordance with ARCNET (attached resource computer network) standard. The CPU 101 as the control means sends, to the auxiliary device 118, instructions to switch a position of a flapper 33. As a result, during the image formation, it is possible to switch between the use of and the non-use of the cooling separation-type fixing device. In this embodiment, portions or means excluding the auxiliary device are substantially identical to those in Embodiment 1, the portions or means are represented by the same reference numerals or symbols and are omitted from description.

(Cooling Separation-Type Fixing Device)

The cooling separation-type fixing device provided inside the auxiliary device 114 will be described. When the cooling separation-type fixing device is used, compared with the case of using the high-temperature separation-type fixing device, it is possible to increase the gloss of the image formed on the sheet. In this embodiment, the cooling separation-type fixing device performs processing for increasing the gloss with respect to the sheet heated by the high-temperature separation-type fixing device, thus being referred to as the glossing means.

Figure 11:
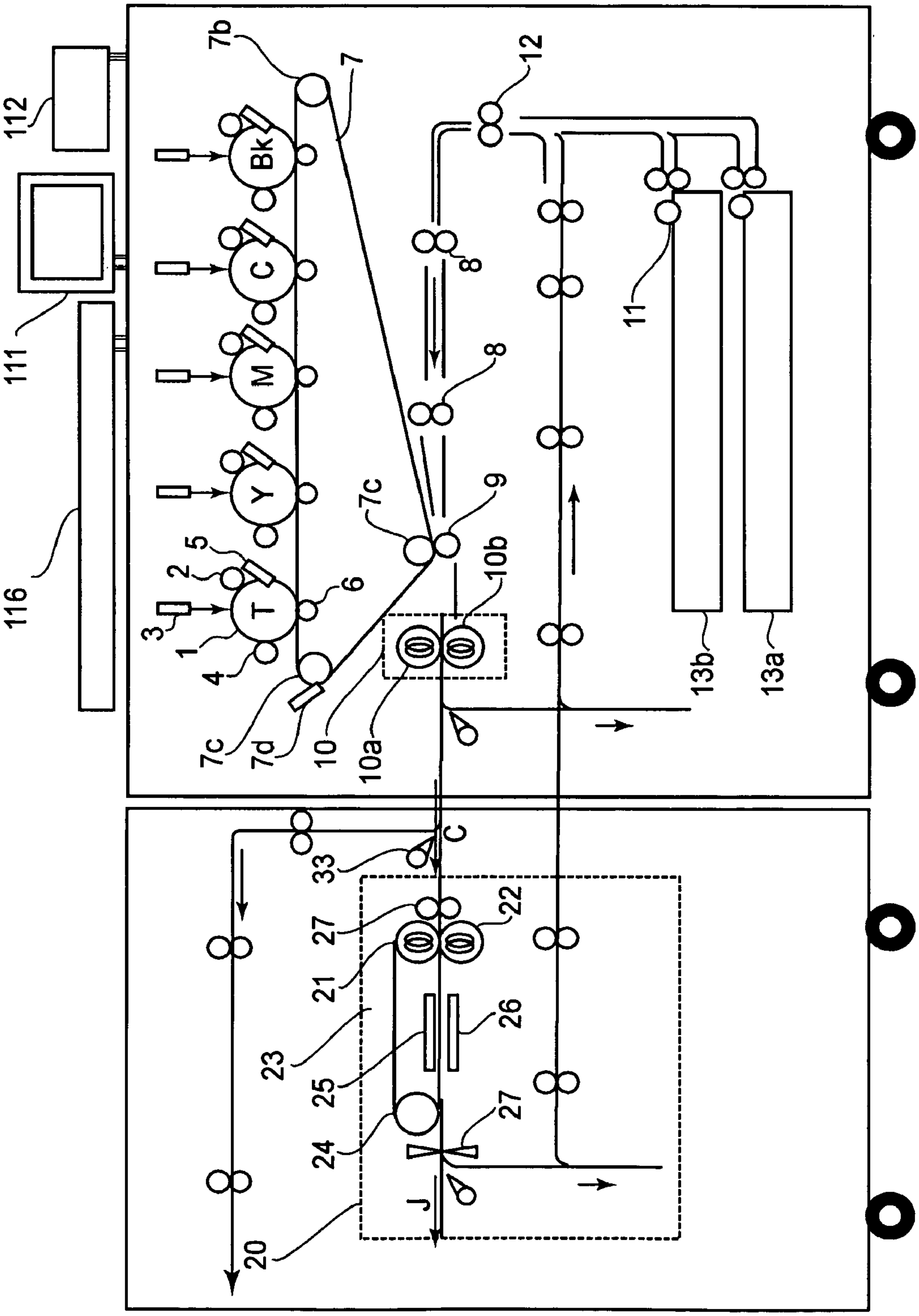
FIG. 11 is a schematic view showing a structure of an MFP in a still another embodiment of the present invention.

As shown in FIG. 11, on a downstream side of the fixing device 10 along the sheet conveyance path, the cooling separation-type fixing device 20 as the glossing means which is a principal portion in this embodiment is disposed.

The fixing device 20 is constituted by an endless belt 23 having a high-gloss surface, a pressing roller 22 for forming a nip between the belt 23 and the pressing roller 22, and cooling devices 25 and 26.

The belt 23 has a function of transferring its high-gloss surface onto the transparent image surface by being heated while intimately contacting the image surface of the sheet P. In this embodiment, the belt 23 having a surface glossiness (at 60 degrees) of 100% was used. Incidentally, by using the belt having the surface glossiness of 60% to 100%, it is possible to increase the glossiness of the image compared with the case of the high-temperature separation-type fixing device. For that reason, the belt, which intimately contacts the image surface, of the cooling separation-type fixing device is only required to have the surface glossiness of 60% or more.

The fixing belt 23 in this embodiment has a three-layer structure consisting of a base layer (base material), an elastic layer, and a toner parting layer. As the base layer (base material) for the belt 23, a layer of polyimide which is a thermosetting resin material was used. It is also possible to use other thermosetting resin materials, heat-resistant resin materials, and metal materials. As the elastic layer for covering the base layer, a layer of a silicone rubber having heat-resistivity was used. It is also possible to use a fluorine-containing rubber or the like in place of the silicone rubber. As the toner parting layer for covering the elastic layer, a fluorine-containing resin material layer was used.

With respect to a thickness dimension of the belt 23, an excessively small thickness can lead to an insufficient strength of the belt itself or insufficient pressure application to a toner receiving layer for toner embedding. An excessively large thickness can lead to an increase in heat quantity necessary to heat the belt, thus resulting in insufficient toner embedding. Therefore, the thickness dimension of the belt 23 may preferably be in a range from 100 μm to 300 μm. In this embodiment, the belt 23 having a thickness of 100 μm was used.

The belt 23 is stretched between a heating roller 21 and a tension roller 24. The heating roller 21 receives a driving force from the auxiliary device and functions as a driving roller. When the heating roller 21 is rotationally driven by receiving the driving force, the stretched belt 23 is rotationally driven around the heating roller 21 and the tension roller 24.

The heating roller 21 includes a core metal having a good thermal conductivity and a rubber layer as an elastic layer for covering the core metal. The core metal of the heating roller 21 has a hollow pipe shape. The core metal is formed of aluminum in a diameter of 44 mm and in a thickness of 5 mm. The rubber layer is formed of a silicone rubber to have a JIS-A hardness of 50 degrees and a thickness of 300 μm.

Inside the heating roller 21, a halogen heater as the heating source is provided. As the heating source, it is also possible to a so-called IH-type heating source using electromagnetic induction heating.

In the neighborhood of an outer peripheral surface of the belt 23 contacting the heating roller 21, a thermistor as a detecting means for detecting a temperature of the belt 23 is provided. A detection signal outputted from the thermistor is sent to the printer controller 108. The printer controller 108 controls electric power supplied to the halogen heater on the basis of the received detection signal. As a result, the printer controller 108 controls, the temperature of the belt 23, at a portion where the belt 23 is wound about the heating roller 21, so as to be kept at 130° C.

The tension roller 24 is provided at a separation portion at which the sheet is separated from the belt 23 by its outer diameter curvature. In this embodiment, a diameter of the tension roller 24 is 30 mm. As a result, the sheet is separated from the belt 23 by "large rigidity" possessed by the sheet.

The pressing roller 22 is rotatably provided at a position in which the pressing roller 22 is located oppositely to the heating roller 21 through the belt 23. The pressing roller 22 is rotated by friction caused by go-around movement of the belt 23. The pressing roller 22 is formed as a hollow roller prepared by providing a core metal with a rubber layer as an elastic layer. The rubber layer is formed of a silicone rubber in a thickness of 3 mm. Inside of the pressing roller 22, the heating source such as the halogen heater is provided. As a result, the pressing roller 22 heats the sheet together with the heating roller 21. As the heating source, it is also possible to use those of another type such as the IH using electromagnetic heating. The pressing roller 22 nips the belt 23 in cooperation with the heating roller 21. In this embodiment, a total pressure for nipping the belt 23 is 50 kgw (490 N). The pressing roller 22 forms the nip between the pressing roller 22 and the belt 23. In this embodiment, the formed nip had a length of 5 nm with respect to the sheet conveyance direction.

Similarly as in the case of the heating roller 21, in the neighborhood of the outer peripheral surface of the pressing roller 22, the thermistor as the detecting means for detecting the temperature of the pressing roller 22 is provided. The detection signal outputted from the thermistor is sent to the printer controller. The printer controller controls electric power supplied to the halogen heater on the basis of the received detection signal. In this embodiment, the printer controller controls the electric power so that the surface temperature of the pressing roller 22 is kept at 90° C.

The sheet P which has been heated and pressed in the nip formed between the belt 23 and the pressing roller 22 is conveyed in intimate contact with the belt 23. The sheet P intimately contacting the belt 23 is conveyed in a cooling area in which the sheet P is cooled by cooling fans 25 and 26 as a cooling means. The cooling fans 25 and 26 cools the belt 23 in the cooling area. The cooling fans 25 and 26 are provided with an inside duct and an outside duct mounted on an inner surface side and an outer surface side of the cooling area for the belt 23. Cooling air generated by the cooling fans 25 and 26 is constituted so as to pass through the inside of each of the inside duct and the outside duct. As a result, the temperature of the sheet surface contacting the belt 23 is cooled down to about the temperature of the glass transition point of the toner until the sheet P reaches the position where the sheet P is separated from the belt 23.

The cooling fans 25 and 26 may also be provided on either one of the inner and outer surface sides of the sheet P. Further, the cooling means may also be a heat pipe containing therein a coolant such as water, a heat sink, or a Peltier element and therefore is not limited to the cooling fans.

When the thus-constituted fixing device 20 is used, a separation temperature at which the sheet P stars to separate from the belt 23 is sufficiently lower than that for the fixing device 10. That is, the fixing device 10 is the fixing device of the "high-temperature separation-type". Further, the fixing device 20 is the fixing device of the "low-temperature separation-type" in which the sheet P starts to separate from the belt 23 in a low-temperature state of the sheet P.

Flow of the separation of the sheet after the above-constituted fixing device 20 as the glossing means heats the image formed on the sheet and then the sheet is cooled.

The sheet on which the image is fixed by the fixing device 10 of the high-temperature separation-type is sent to the fixing device 20 as the glossing means in a state in which the sheet is kept at a high temperature of, e.g., 80° C. The sheet P sent to the fixing device 20 as the glossing means is re-heated at its image surface. At this time, the image fixed on the sheet is heated up to about 110° C. sufficiently higher than the glass transition temperature (Tg) of the toner.

Thereafter, the sheet P is conveyed in the cooling area while intimately contacting the belt 23 and is cooled by the cooling fans 25 and 26 as the cooling means. The temperature of the cooled image surface is lowered to about 50° C. which is not more than the glass transition temperature (Tg) of the toner.

By cooling the image to the temperature of not more than the glass transition temperature (Tg), the glossiness of the image surface is increased in accordance with the glossiness of the surface of the belt 23. Sufficiently cooled sheet P is separated at the separation portion by stiffness or large rigidity thereof. In this case, the toner at the sheet surface is sufficiently cooled, thus being solidified. As a result, it is possible to suppress transfer of the toner from the sheet surface onto the belt 23. For that reason, the image surface formed on the sheet is less liable to be uneven and is not readily roughened by the separation.

The sheet P separated from the belt 23 is subjected to cutting of end marginal portions by a cutter 27 as desired. As a result, the sheet in a margin-less state is outputted.

(Screen Displayed at Display)

Figure 12:
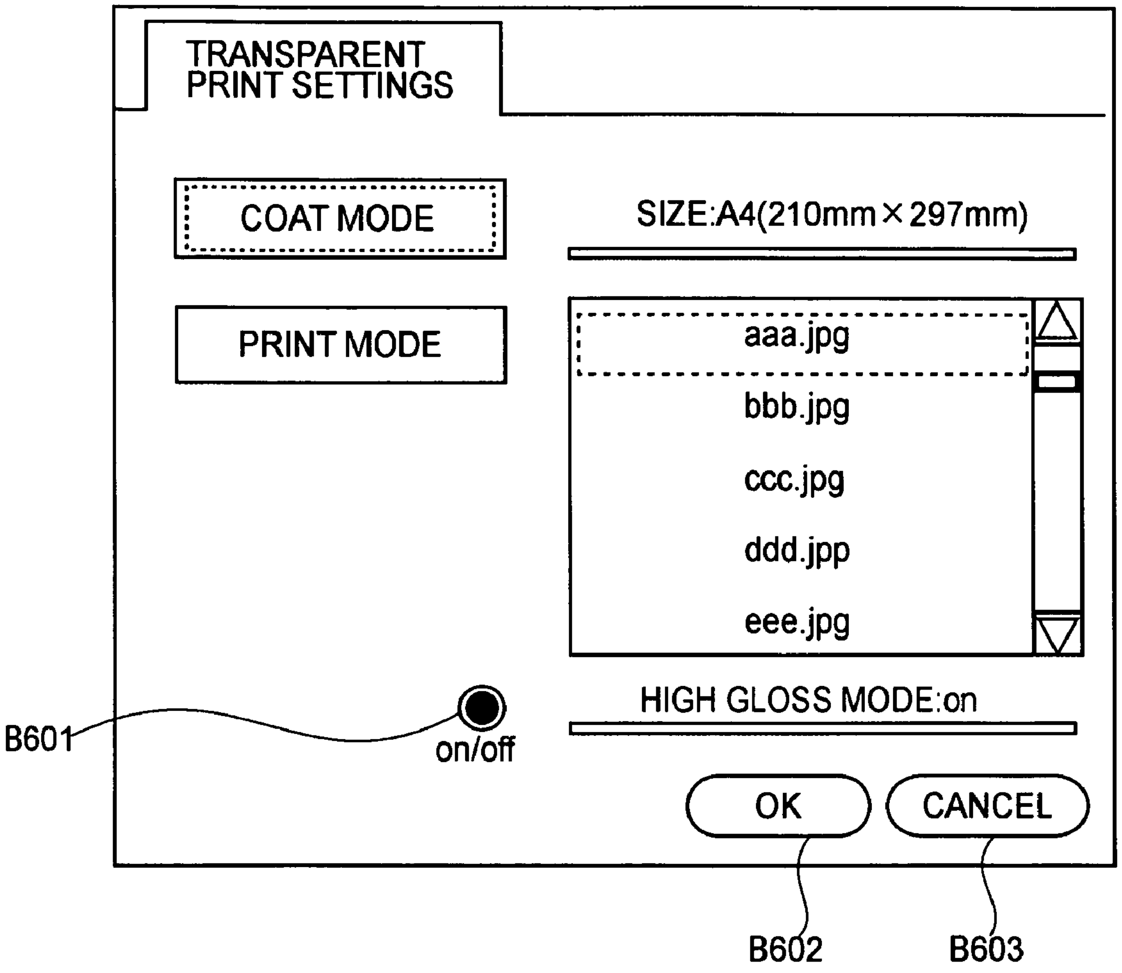
FIG. 12 is a schematic view showing an example of a screen displayed on a display of the MFP in the still another embodiment of the present invention.

FIG. 12 is a schematic view showing a screen displayed at the display of the MFP 100. Portions or buttons substantially identical to those in Embodiment 1 are omitted from description. B601 represents a button for selecting a "HIGH GLOSS MODE". In the case where the button B601 is selected, information of selection of the "HIGH GLOSS MODE" in which the sheet is processed by using the fixing device 20 as the glossing means during the image formation is held in the RAM 102.

The user can reflect the set information by selecting a button B602 (OK button). Further, the user can destruct the set transparent print information by selecting a button B603 (cancel button). In the screen shown in FIG. 12, the "HIGH GLOSS MODE" and the "TRANSPARENT COAT MODE" are selected.

(Operation Explanation of MFP Along Flow Chart)

Figure 13:
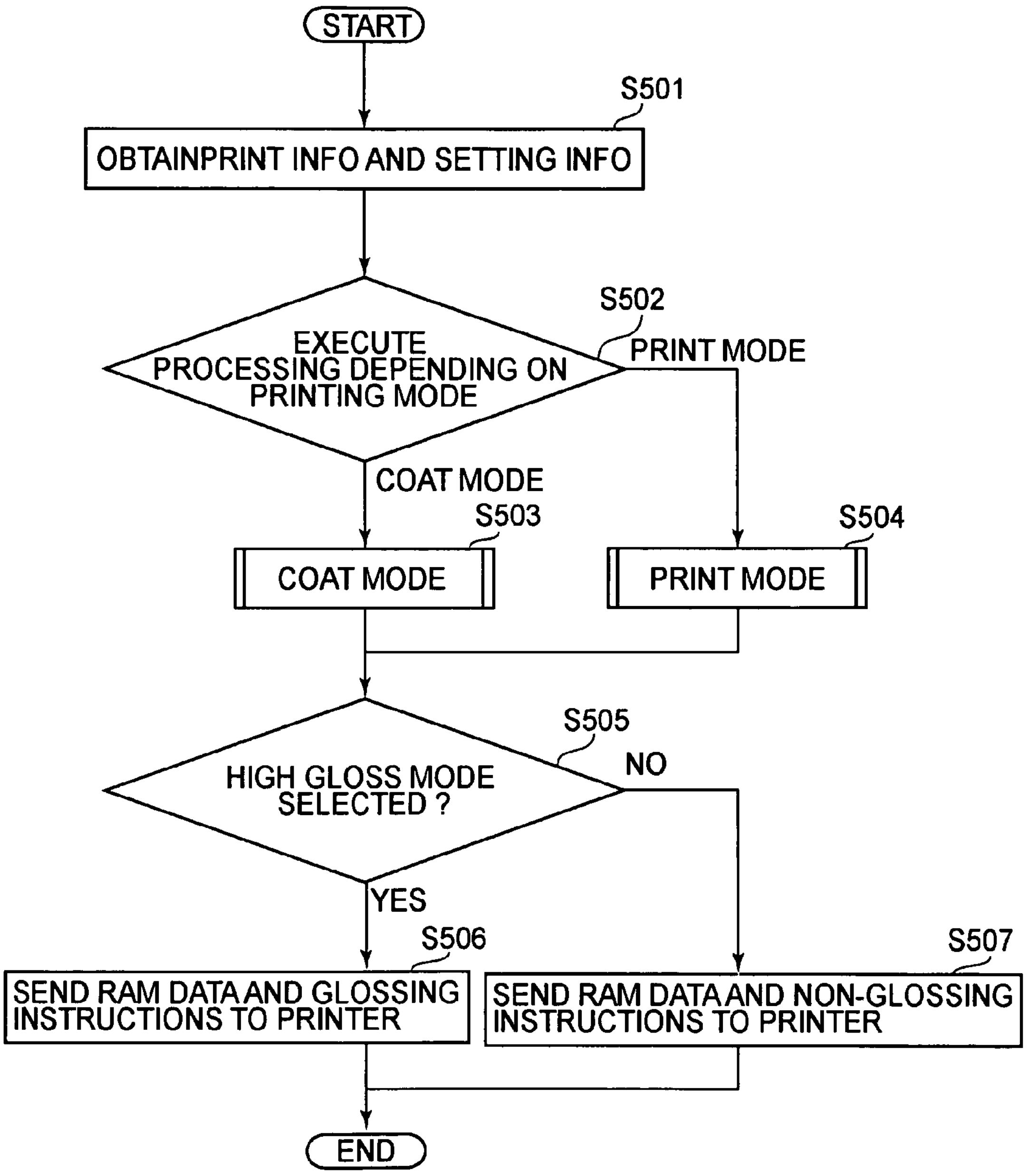
FIG. 13 is a flow chart showing a procedure for controlling an operation of the MFP in the still another embodiment of the present invention.

On the basis of the information set by operating the above-described setting screen, the image forming apparatus operates as follows. FIG. 13 is a flow chart showing a procedure of image processing. In this embodiment, the image processing as a characterized processing is executed in the CPU 101 of the MFP 100. An operation for processing the image, by the CPU 101 as the control means, in accordance with a program stored in the ROM 103 will be described. The transparent print settings (the transparent printing means and the designated image data) and the setting information (the size of the sheet used for the printing and use or non-use of the fixing device 20) are stored in the RAM 102.

Steps S501 to S504 are equal to the steps S101 to S104 in Embodiment 1, thus being omitted from description.

In this embodiment, the CPU 101 as the control means switches between use and non-use of the fixing device 20 as the glossing means on the basis of the setting information.

S505 represents a step for changing the processing depending on whether the fixing device 20 as the glossing means is used or not. The CPU 101 executes processing in a step S506 when the setting information obtained in the step S501 is set so as to use the high gloss means. The CPU 101 executes processing in a step S507 when the setting information obtained in the step S501 is set so as not to use the high gloss means.

S506 represents a step for forming the image by sending the data stored in the RAM 102 to the printer portion when the image glossiness is enhanced by using the fixing device 20 as the high gloss means. The CPU 101 sends the transparent image data stored in the RAM 102 to the printer portion in the step S503 or S504. Further, the CPU 101 sends, to the printer portion, control instructions such that the gloss of the image fixed on the sheet is enhanced by the fixing device 20.

S507 represents a step for forming the image by sending the image data stored in the RAM 102 to the printer portion when the image is formed without using the fixing device 20 as the high gloss means. The CPU sends the transparent image data stored in the RAM 102 to the printer portion in the step S503 or S504. Further, the CPU 101 sends, to the printer portion, control instructions not to use the fixing device 20. That is, the MFP as the image forming apparatus includes the fixing device 10 as the fixing means for fixing the image formed on the sheet and the cooling separation-type fixing device 20 as the glossing means for improving the glossiness of the image fixed on the sheet by the above-described fixing means. The MFP has a "HIGH GLOSSING MODE" (first mode) for effecting the image formation by using the fixing device 10 as the fixing means and the fixing device 20 as the glossing means and a means (second means) for effecting the image formation by using the fixing device 10 as the fixing means. Herein, the processing for enhancing the glossiness of the image is referred to as glossing processing.

By effecting the control as described above, the glossiness of the image can be adjusted in two steps.

Embodiment 4

In Embodiment 1 to Embodiment 3, the case of using the matte coated paper as the sheet on which the image is to be formed was described. For that reason, the gloss was high when the image was formed on the sheet by using the fixing device 10. However, the image is formed on various types of sheets in POD (print on demand) or in the field of commercial printing.

For that reason, the case of forming the image on gloss coated paper increased in glossiness by coating the sheet surface with the transparent toner will be considered. In the case where the matte coated paper is coated with the transparent toner and then is subjected to the fixation by the fixing device 10, the glossiness of the sheet surface is higher than that before the coating with the transparent toner. However, in the case where the gloss coated paper is coated with the transparent toner and then is subjected to the fixation by the fixing device 10, the glossiness of the sheet surface is lower than that before the coating with the transparent toner. Therefore, it has been found that the glossiness is lowered by coating the entire image formable area with the transparent toner in the case of using some type of the sheet to be subjected to the image formation. Therefore, in this embodiment, an apparatus for finishing the image surface so as to have the glossiness higher than that of the sheet by using the fixing device 20 of the cooling separation type in the case where the sheet on which the image is to be formed is high glossy paper will be described. The image forming apparatus used has the substantially same constitution as that in Embodiment 3. For that reason, the constituent elements of the apparatus are represented by the same reference numerals or symbols, thus being omitted from description. The high glossy paper refers to a sheet on which the glossiness at an image-formed portion is lowered when the toner image is fixed on the sheet by using the fixing device 10 of the high-temperature separation type. On the other hand, lower glossy paper refers to a sheet on which the glossiness at the image-formed portion is increased when the toner image is fixed on the sheet by the fixing device 10.

(Relationship Between Glossiness and Amount of Toner Applied onto Sheet)

Figure 14:
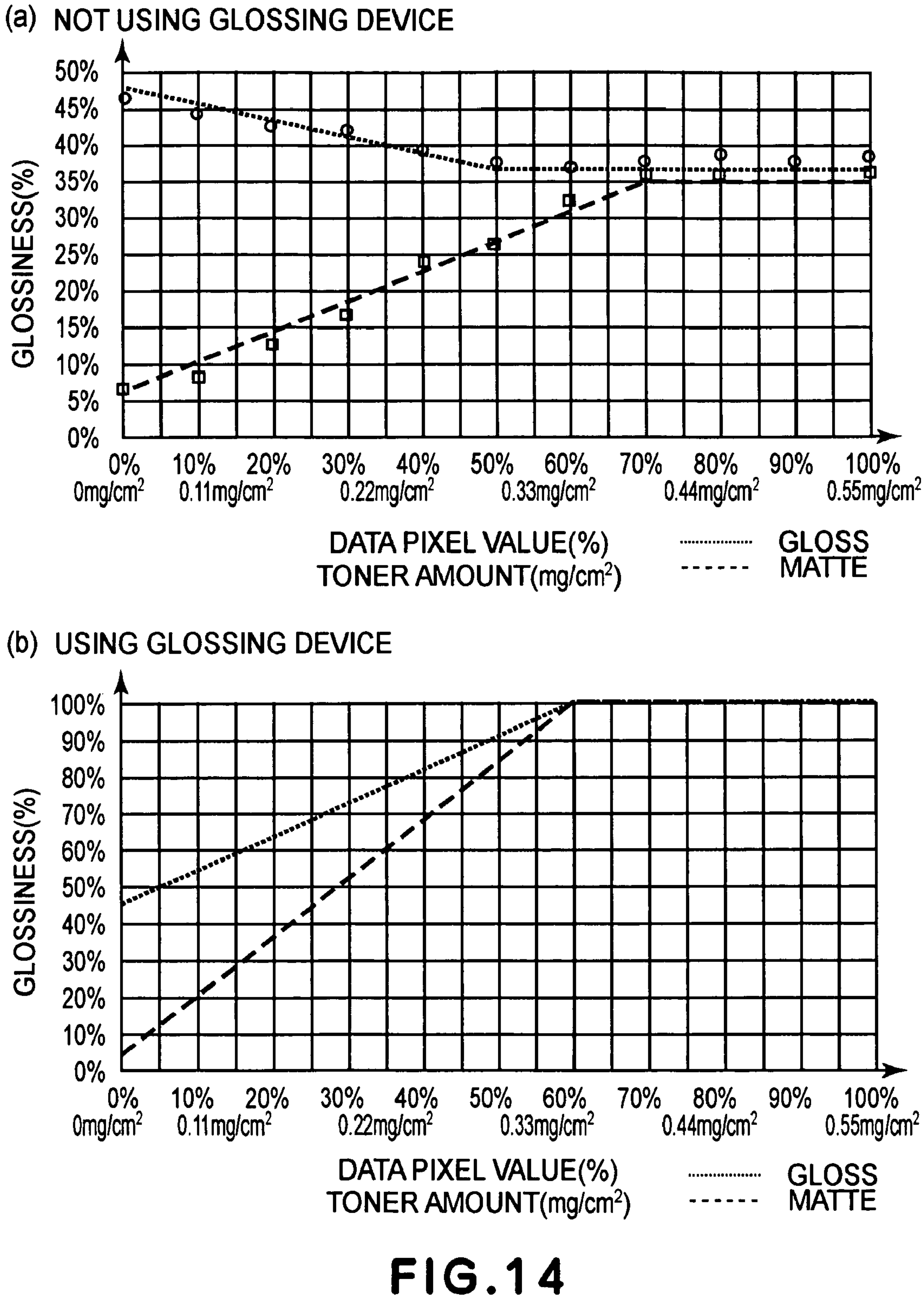
FIGS. 14(*a*) and 14(*b*) are graphs each showing a relationship between a change in toner amount and a change in glossiness in the case of using gloss coated paper and matte coated paper in a further embodiment of the present invention.

FIG. 14(*a*) and FIG. 14(*b*) are graphs showing relationships between the toner amount per unit area and the glossiness when the image formed on the sheet is fixed by the fixing device 10 without using the fixing device 20 (the glossing device) and by the fixing device 20, respectively. In these figures, a dotted line represents a result of the case of using the gloss coated paper as the image fixation sheet, and a broken line represents a result of the case of using the matte coated paper as the image fixation sheet. In this embodiment, as the matte coated paper, "U-Light" (trade name) (mfd. by Nippon Paper Industries Co., Ltd.) having a basis weight of 157 $g/m^2$ was used. Further, as the gloss coated paper, "Golden Cask Super Art" (trade name) (mfd. by Oji Paper Co., Ltd.) having a basis weight of 157 $g/m^2$ was used.

In the case where the toner image formed on the matte coated paper is fixed by using the high-temperature separation-type fixing device 10 (FIG. 14(*a*)), the glossiness is increased in proportion to the toner amount (per unit area). On the other hand, in the case where the toner image formed on the gloss coated paper is fixed by using the high-temperature separation-type fixing device 10 (FIG. 4(*a*)), the glossiness is decreased in proportion to the toner amount. As shown in the graph of FIG. 14(*a*), when the surface of the matte coated paper is sufficiently coated with the toner in the amount (corresponding to 60% to 70% as the data pixel value in this embodiment), the glossiness is not increased even when the transparent toner amount is increased. Similarly, when the surface of the gloss coated paper is sufficiently coated with the toner in the amount (corresponding to 50% to 60% as the data pixel value in this embodiment), the glossiness is not decreased even when the transparent toner amount is increased.

In the case where the toner image formed on each of the matte coated paper and the gloss coated paper is fixed by the cooling separation-type fixing device 20 (FIG. 14(*b*)), the glossiness is increased in proportion to the toner amount. Similarly as in the case of using the high-temperature separation-type fixing device 10, in the case where the sheet surface is sufficiently coated with the transparent toner in the amount (corresponding to 60% to 70% as the data pixel value in this embodiment), the glossiness is not increased even when the transparent toner amount is increased.

As described above, when the glossiness of the image formed on the gloss coated paper is intended to be higher than that before the fixation, it is necessary to use the fixing device 20 of the cooling separation type.

(Screen Displayed at Display)

Figure 15:
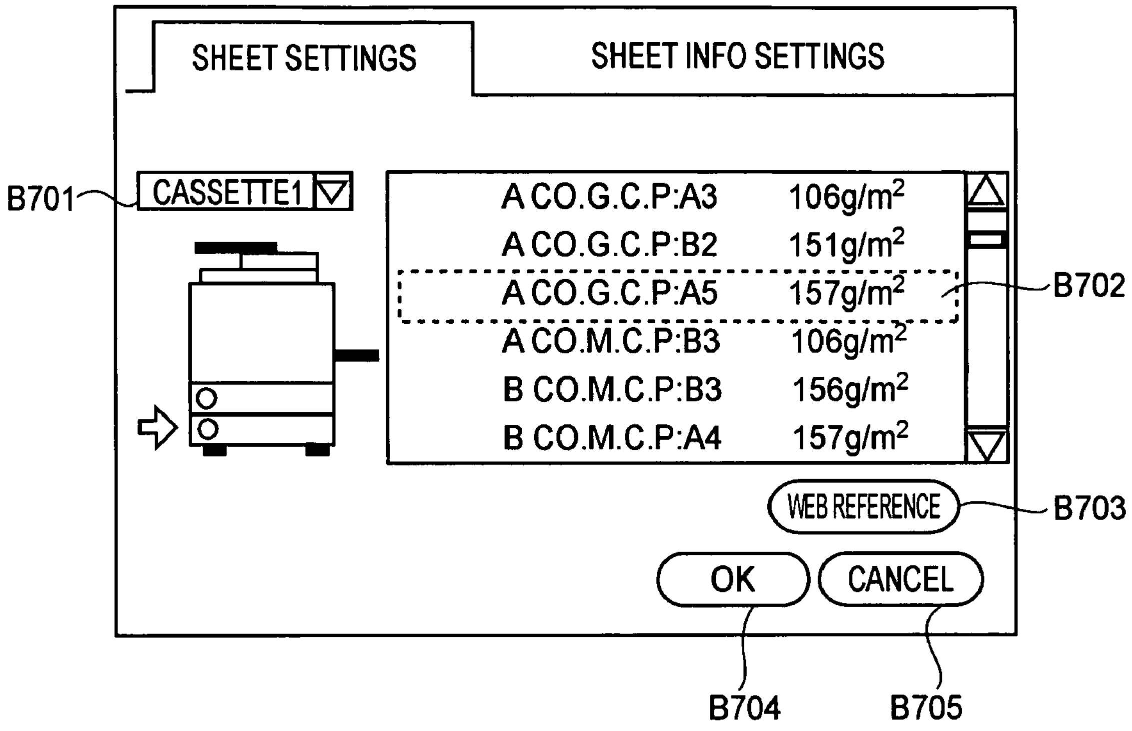
FIG. 15 is a schematic view showing an example of a screen displayed on a display of the MFP in the further embodiment of the present invention.

FIG. 15 is a schematic view showing a screen displayed at the display of the MFP 100. Portions or buttons substantially identical to those in Embodiment 1 will be omitted from description. In the case where the image formed on the gloss coated paper is fixed by the fixing device 10, the resultant gloss can be lower than the gloss intrinsic to the gloss coated paper. For that reason, the user using the MFP was required to manually change the setting so as to use the fixing device 20 of the cooling separation type in the case of using the high glossy paper as the sheet. However, it is difficult for the user to judge as to whether which type of sheet among various types of sheets is classified into the high glossy paper. Further, the type of sheet classified into the high glossy paper varies depending on characteristics of the MFP main assembly (e.g., the constitution of the fixing device, the physical property of the toner used for forming the image, etc.).

For that reason, the user inputs the type of sheet subjected to the image formation by operating the screen displayed at the display. The CPU 101 classifies the sheet type inputted by the user depending on information on the characteristics of the MFP main assembly stored in the RAM 102. Incidentally, in the case where the toners different in physical property are not used in a refilling manner, the classification can be made uniquely. For that reason, it is also possible to classify the type of sheet inputted by the user by using a table, stored in the RAM 102, in which the types of sheets are associated with their classifications.

FIG. 15 is a schematic view showing an example of the screen displayed on the display 111 when the button B704 is selected by the user. In the state in which the screen shown in FIG. 15 is displayed, the user can set the sheet type to be used for the printing.

B701 represents a pull-down menu for changing the position where the sheets are accommodated. The user can set the position where the sheets used for printing are accommodated. B702 represents a selectably displayed list for changing the type of the sheet used for the printing. In the screen shown in FIG. 15, the user can confirm that the type of sheet, accommodated in "CASSETTE 1" is "A COMPANY-MADE GLOSS COATED PAPER: A5 BASIS WEIGHT: 157 g/m$^2$". In the screen shown in FIG. 3(*b*), the sheet size used for the printing is A4 size. The information on the type of sheet used for the printing and the size information which are set in such a setting screen are stored in the RAM 102. B703 represents a button for externally adding the type of sheet when the sheet type is not displayed in the list. In the state in which the information on the type of sheet used for the printing is set, the user can reflect the setting information by selecting a button B704 (OK button). When the user selects the button B704 (OK button), the CPU 101 displays the screen shown in FIG. 3(*a*) at the display 111.

Further, the user can destruct the setting information by selecting a button B705 (cancel button) When the user selects the button B705 (cancel button), the CPU 101 destructs the information set in the screen shown in FIG. 15 and displays the screen shown in FIG. 3(*a*) at the display 111.

(Operation Explanation of MFP Along Flow Chart)

Figure 16:
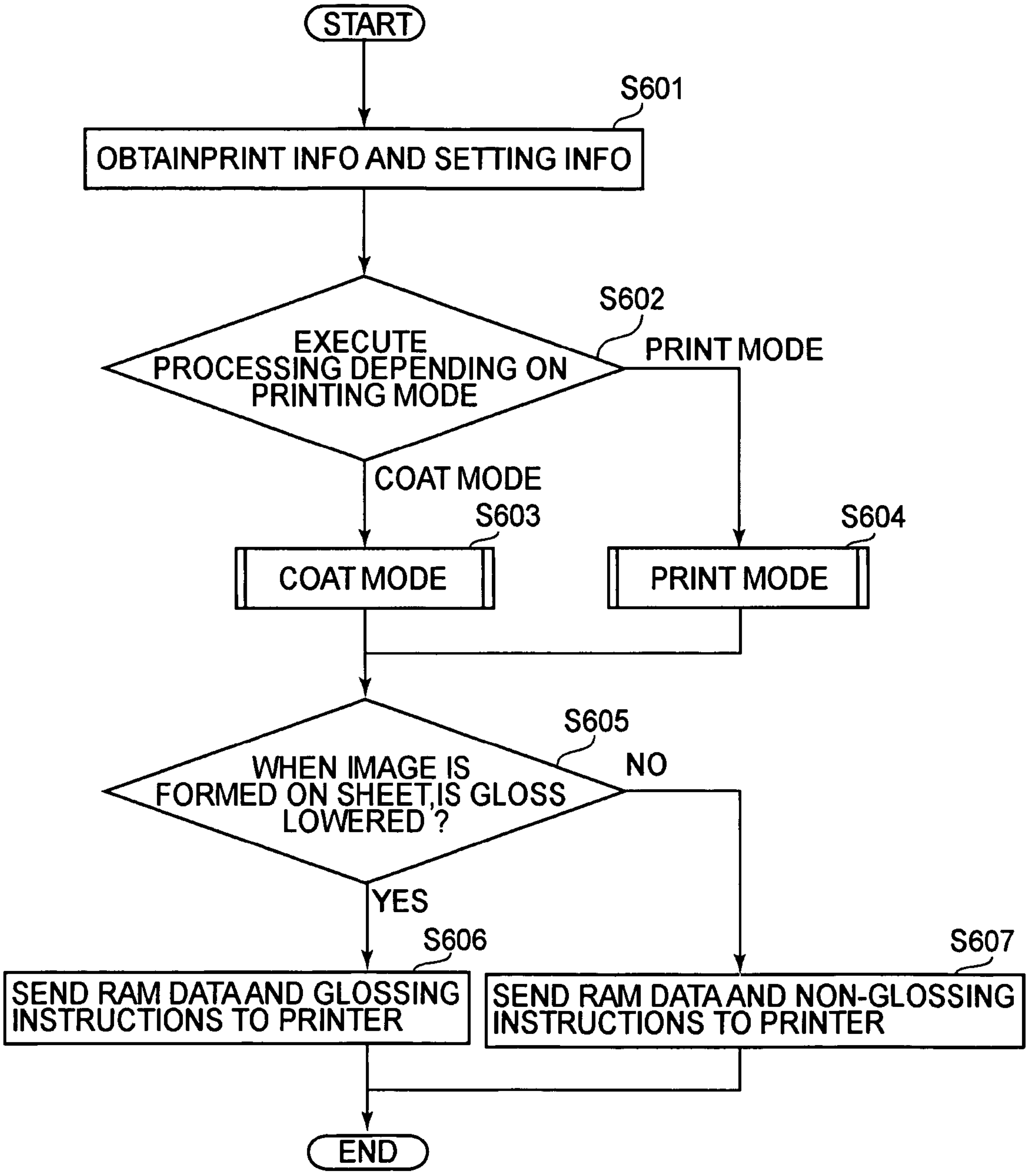
FIG. 16 is a flow chart showing a procedure for controlling an operation of the MFP in the further embodiment of the present invention.

On the basis of the information set in the above-described setting screen, the image forming apparatus operates as follows. FIG. 16 is flow chart showing a procedure of image processing. In this embodiment, the image processing as a characterized processing is executed in the CPU 101 of the MFP 100. An operation for processing the image, by the CPU 101 as the control means, in accordance with a program stored in the ROM 103 will be described. The transparent print settings (the transparent printing means and the designated image data) and the setting information (the type and the size of the sheet used for the printing) are stored in the RAM 102.

Steps S601 to S504 are equal to the steps S101 to S104 in Embodiment 1, thus being omitted from description.

The operation of the MFP will be described along the flow chart. The CPU 101 controls the printer portion so as to use the fixing device 20 as the glossing means when the image formation sheet is the high glossy paper.

S605 represents a step for changing the processing depending on the type of the image formation sheet. The CPU 101 executes processing in a step S606 when the sheets accommodated in the cassette are classified into the high glossy paper. The CPU 101 executes processing in a step S607 when the sheets accommodated in the cassette are classified into the low glossy paper.

S606 represents a step for forming the image by using the fixing device 20 when the sheets accommodated in the cassette are the high glossy paper. The CPU 101 sends the transparent image data stored in the RAM 102 to the printer portion in the step S603 or S604. Further, the CPU 101 sends, to the printer portion, control instructions to use the fixing device 20.

S607 represents a step for forming the image by using the high-temperature separation-type fixing device 10 when the sheet accommodated in the cassette is the low glossy paper. The CPU sends the transparent image data stored in the RAM 102 to the printer portion in the step S603 or S604. Further, the CPU 101 sends, to the printer portion, control instructions not to use the fixing device 20.

In this embodiment, the CPU 101 changes the processing based on whether the sheet is the high glossy paper or the lower glossy paper but may also change the processing based on information corresponding to the glossy of the sheet. That is, the CPU 101 obtains the information on the glossiness and then executes the processing in the step S606 when the sheet glossiness is not less than a predetermined value. The MFP 100 as the image forming system includes the CPU 101 as a glossy obtaining means for obtaining the information corresponding to the gloss of the sheet. When the sheet glossiness obtained by the CPU 101 as the gloss obtaining means is not less than 35% as the predetermined value in this embodiment, the CPU 101 as the control means controls the image formed on the sheet so as to have a glossiness higher than that of the sheet by using the fixing device 10 as the fixing means and the fixing device 20 as the glossing means.

As described above, by controlling the MFP, it is possible to prevent the lowering in gloss at the portion where the image is formed by fixing the transparent toner on the high glossy paper with the use of the fixing device 10.

Embodiment 5

(Image Forming System)

In Embodiment 1 to Embodiment 4, the image data for forming the transparent image on the entire image formable area of the sheet depending on the sheet size was stored in the MFP 100 main assembly. However, there is no need to store the image data in the HDD 104 of the MFP 100. Further, also with respect to the selecting means for selecting the image data depending on the size of the image formation sheet, there is no need to use the CPU 101 of the MFP 100 as the selecting means.

In Embodiments 1 and 2, the image forming system was consisting only of the MFP 100 as the image forming apparatus. Further, in Embodiments 3 and 4, the image forming system was consisting of the MFP 100 as the image forming apparatus and the auxiliary device 114.

In this embodiment, an image forming system consisting of the MFP 100 as the image forming system and the PC 300 and an image forming system consisting of the MFP 100, the PC 300, and the MFP controller 200 will be described.

(Example of Image Forming System)

Figure 17:
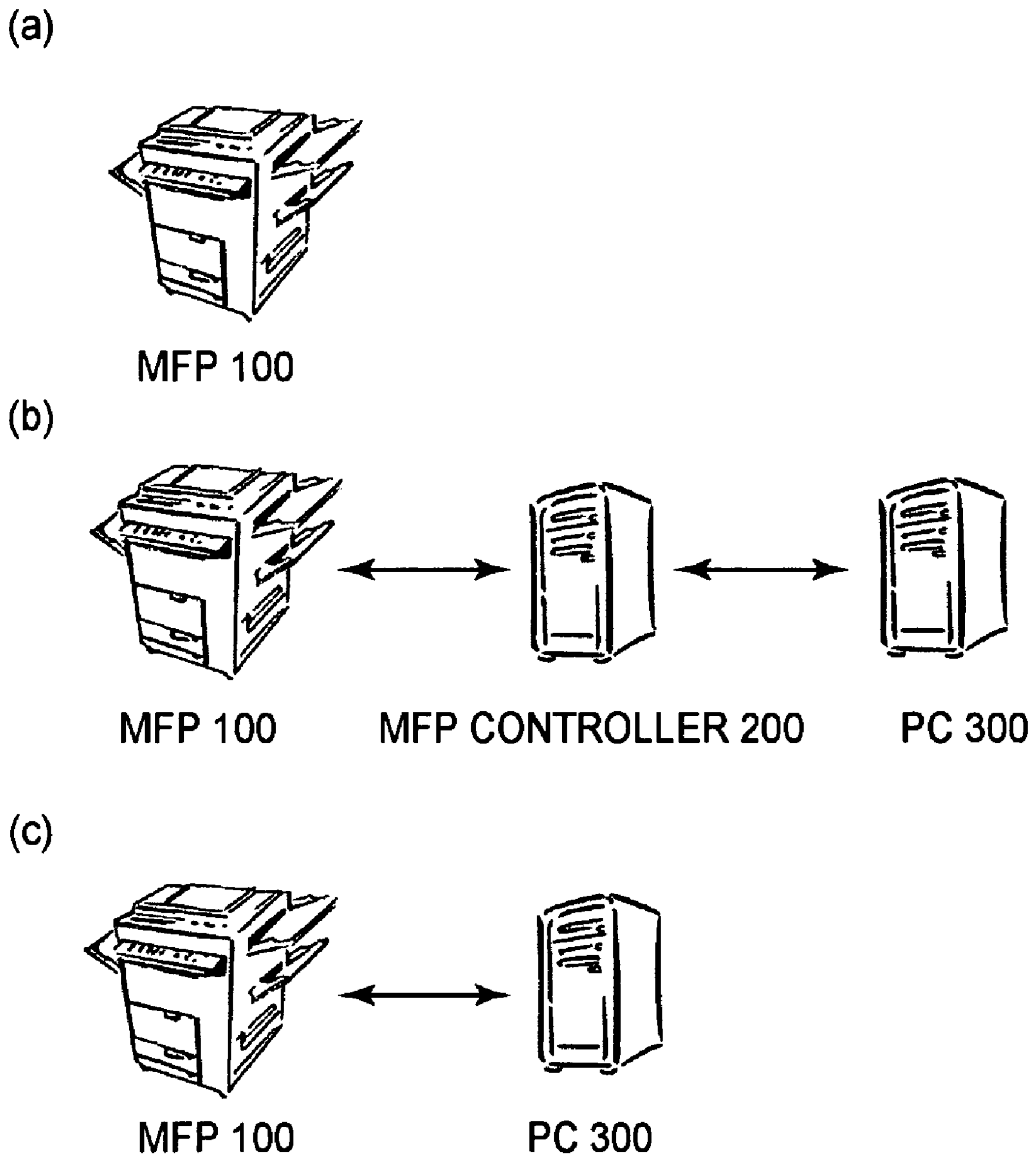
FIGS. 17(*a*), 17(*b*) and 17(*c*) are schematic views each showing an example of a constitution of an image forming system in a still further embodiment of the present invention.

FIGS. 17(*a*) to 17(*c*) are schematic views each showing a constitution example of the image forming system. The image forming system shown in FIG. 17(*a*) is constituted by the MFP 100 alone. As the image forming system constitution, constitutes as shown in FIGS. 17(*b*) and 17(*c*) are also considered.

The image forming system shown in FIG. 17(*b*) is constituted by the MFP 100, the MFP controller 200, and the PC 300. The image forming system shown in FIG. 17(*c*) is constituted by the MFP 100 and the PC 300. Hardware configurations of the PC 300 and the MFP controller 200 will be described.

The PC 300 constituting the image forming system is an example of an external terminal capable of sending print instructions to the MFP 100. For that purpose, it is also possible to use other terminals capable of sending the print instructions to the MFP 100 as an alternative to the PC. For example, it is possible to use portable information terminals such as a WS (work station) and a PDA (personal digital assistant) as the alternative to the PC.

(Hardware Configuration of PC)

Figure 18:
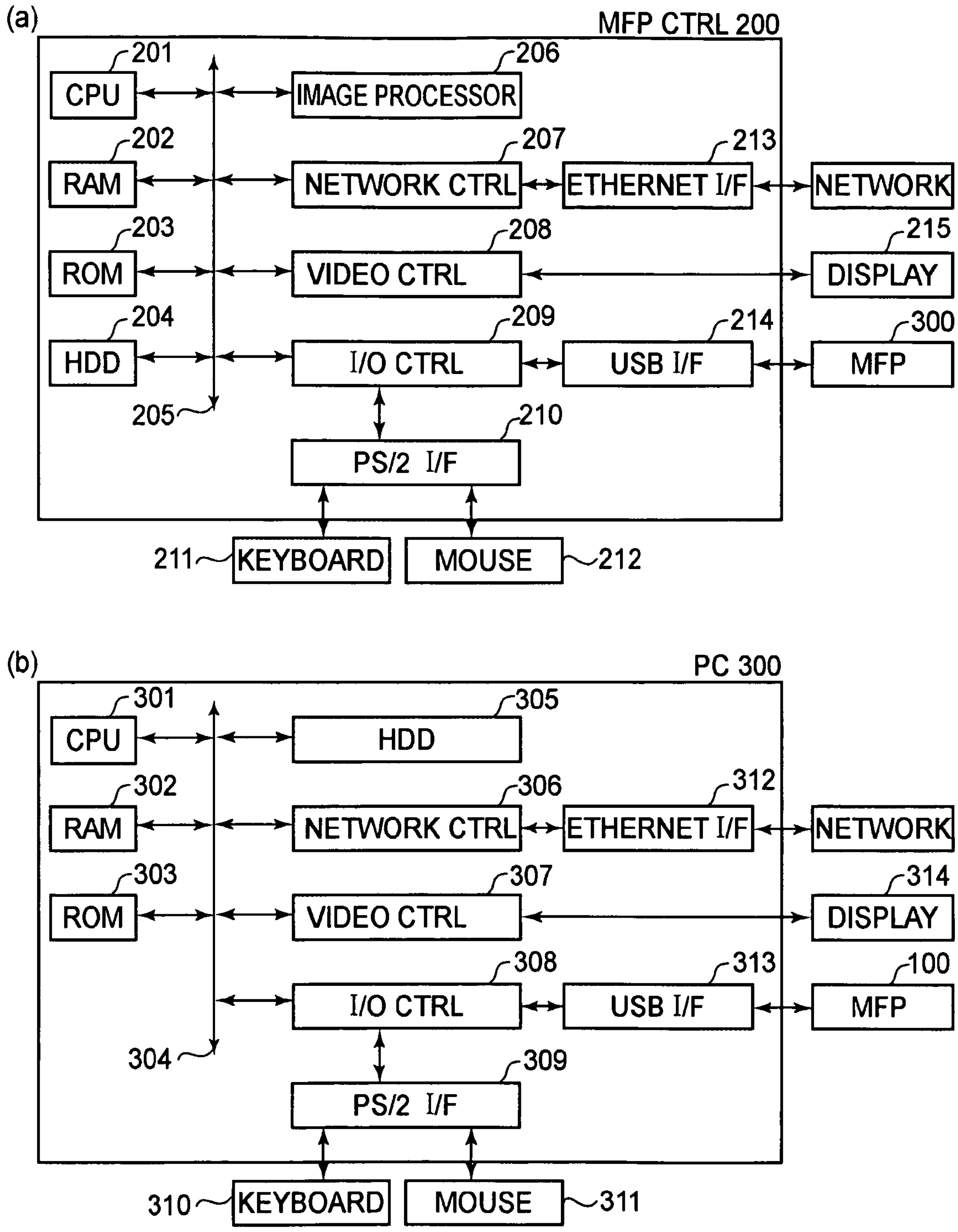
FIGS. 18(*a*) and 18(*b*) are block diagrams showing schematic constitutes of a PC (personal computer) and an MFP, respectively, in the still further embodiment of the present invention.

FIG. 18(*b*) is a block diagram showing the hardware configuration of the PC 300 as an example of the PC. The hardware configuration of the PC 300 will be described.

A CPU 301, an RAM 302, and an ROM 303 are connected to a bus 304. Similarly, a HDD 305, a network controller 306, a video controller 307, and an I/O controller 308 are connected to the bus 304. The various units connected to the but 304 are communicable with each other through the bus 304. The CPU 301 executes a program, e.g., stored in the ROM 303 by expanding the program in the RAM 302. The ROM 303 stores the program executed by the CPU 301. The RAM 302 is used when the CPU 301 executes the program. Further, the CPU 301 sends control instructions and the like to the HDD 305, the network controller 306, the video controller 307, and the I/O controller 308 through the bus 304. Further, the CPU 301 receives signals for indicating states or data such as image data from the HDD 305, the network controller 306, the video controller 307, and the I/O controller 308 through the bus 304. Thus, the CPU 301 is capable of controlling the various units constituting the PC 300.

The HDD 305 stores various files used in the PC 300. The network controller 306 is a dedicated circuit for communicating with external equipment. The network controller 306 modifies and converts the signals sent from the CPU 301 into multi-valued signals in accordance with the IEEE 803.2 standard and sends the signals to the network through an ethernet I/F 312. Further, the network controller 306 demodulates the multi-valued signals received from the network through the ethernet I/F 312 and sends the demodulated signals to the CPU 301. In this case, a communication path through which the PC 300 communicates with the MFP 100 or the MFP controller 200 is not limited to that in a LAN (local area network) but may also be that through the Internet.

Further, the I/O controller 308 converts the signals sent for the CPU 301 into signals in accordance with standards for the respective interfaces and sends the converted signals to a device connected with an USB I/F 313 or a PS (personal system)/2 I/F 309. Conversely, the I/O controller 308 converts the signals received from the USB I/F 313 or the PS/2 I/F 309 and sends the converted signals to the CPU 301. As a result, the PC 300 and the MFP 100 can communicate with each other through the USB I/F 313. Further, the PC 300 obtains an input signal from a keyboard 310 and a mouse 311 as an input device through the PS/2 I/F 309.

The video controller 307 converts the I/D into a signal for a screen displayable at a display 314 in accordance with image display instructions received from the CPU 301. As a result, the CPU 301 can display the screen at the display 314.

In this embodiment, the CPU 301 controls various pieces of hardware constituting the PC in accordance with an OS (operating system). As a result, the user can cause the PC to execute a desired operation by manipulating a GUI (graphical user interface) without concern for the hardware constituting the PC. Further, the user is capable of sending the print instructions from an application program, which is running under the OS, to the external MFP. When the print instructions are sent to the MFP, a control method varies depending on the kind of the MFP. For that reason, the PC produces control instructions depending on the MFP by using a driver program corresponding to the kind of the MFP. The driver program is capable of producing the control instructions depending on the connected peripheral equipment by being incorporated in the OS. The explanation on the example of the hardware configuration of the PC in this embodiment is as described above.

(Hardware Configuration of MFP Controller)

FIG. 18(*a*) is a block diagram showing the hardware configuration of the MFP controller 200 capable of converting the PDL into the image data. An example of the hardware configuration of the MFP controller 200 will be described.

The MFP controller 200 constituting the image forming system converts the PDL received from the PC 300 into the image data used for the printing by the MFP 100. The processing for converting the PDL into the image data is referred to as the RIP.

A CPU 201, a RAM 202, a ROM 203, and a dedicated image processing circuit are connected to a bus 204. Similarly, a HDD 206, a network controller 207, a video controller 208, and an I/O controller 209 are connected to the bus 205. The CPU 201 executes a program, e.g., stored in the ROM 203 by expanding the program in the RAM 202. Further, the CPU 201 sends control instructions and the like to the HDD 206, the network controller 207, the video controller 208, and the I/O controller 209 through the bus 205. Further, the CPU 201 receives signals for indicating states and data such as image data from the HDD 206, the network controller 207, the video controller 208, and the I/O controller 209 through the bus 205. Thus, the CPU 201 is capable of controlling the various units constituting the MFP controller 200.

MFP controller 200 is connected with the PC 300 through an ethernet I/F 213. The MFP controller 200 is connected with the MFP 100 through the ethernet I/F 213. The network controller 207 modifies and converts the signals sent from the CPU 201 into multi-valued signals in accordance with the IEEE 803.2 standard and sends the signals to the network through an ethernet I/F 213. Further, the network controller 207 demodulates the multi-valued signals received from the network through the ethernet I/F 213 and sends the demodulated signals to the CPU 201.

Further, the I/O controller 209 converts the signals sent for the CPU 201 into signals in accordance with standards for the respective interfaces and sends the converted signals to a device connected with an USB I/F 214 or a PS (personal system)/2 I/F 210. Further, the I/O controller 209 converts the signals received from the USB I/F 214 or the PS/2 I/F 210 and sends the converted signals to the CPU 201. As a result, the MFP controller 200 and the MFP 100 can communicate with each other through the USB I/F 214. Further, the MFP controller 200 obtains an input signal from a keyboard 211 and a mouse 212 as an input device through the PS/2 I/F 210.

The video controller 208 converts the I/D into a signal for a screen displayable at a display 215 in accordance with image display instructions received from the CPU 201 and sends the converted signal to the display 215. As a result, the CPU 201 can display the screen at the display 215.

The MFP controller 200 receives the PDL sent from the PC 300 and subjects the described PDL to the RIP. Arithmetical operation instructions during the RIP includes uniform iteration process. For that reason, in many cases, a shorter execution time is required for processing by a hardware optimized for processing image processing instructions rather than execution of all the arithmetical operation instructions by the CPU 201. For that reason, the MFP controller executes the RIP by sharing the processing between the CPU 201 and the dedicated image processing circuit 204. The RIP may also be performed by the CPU 201 alone. The dedicated image processing circuit 204 is constituted by an ASIC (application specific integrate circuit). The dedicated image processing circuit 204 may also be constituted by mounting a reconfigurable hardware (e.g., a PLD (programmable logic device)). The thus-converted image data by the CPU 201 and the dedicated image processing circuit 204 is sent to the MFP 100.

In this embodiment, preparation of the image data is carried out by the MFP controller 200 but may also be carried out by the MFP 100.

The explanation on the hardware configuration of the MFP controller in this embodiment is as described above.

(Control Processing in Each Image Forming System)

In this embodiment, the image forming system is constituted by a plurality of devices such as the MFP, the MFP controller, and the PC. In Embodiment 1, the control of the image forming apparatus was carried out by the CPU 101 of the MFP 100 along the flow chart. That is, in the case where the image forming system is constituted by the MFP 100 alone as shown in FIG. 17(*a*), the control processing was carried out by the CPU 101 in the MFP 100. However, as shown in FIG. 17(*b*), the image forming system is constituted by the MFP 100, the MFP controller 200, and the PC 300, there is no need to execute all the steps of the control processing by the CPU 101 of the MFP 100. For example, the CPU 201 of the MFP controller 200 may also execute the control processing. Further, in FIG. 17(*c*), the image forming system is constituted by the MFP 100 and the PC 300. In this case, the CPU 301 of the PC 300 may execute the control processing. Further, the image data for forming the image may be that stored in the HDD 305 of the PC 300.

(Shared Execution of Control Processing in Systematized Device)

As described above, in the system consisting of the plurality of device, there is no need to execute the control processing by the CPU 101 of the MFP 100. Further, there is also no need to execute the control processing always by the CPU of a single device. That is, the plurality of CPUs present in the plurality of devices may also execute the control processing in a shared manner. An example in which the CPU 301 of the PC 300 executes the steps executed by the CPU 101 of the MFP 100 as a substitute for the CPU 101.

(Screen Displayed at Display Connected to PC)

In this embodiment, the user stores the transparent print information and the setting information in the RAM 302 by using the input device such as the mouse 311 or the like depending on the screen displayed at the display 314 of the PC 300. The screen displayed at the display 314 will be described.

Figure 19A:
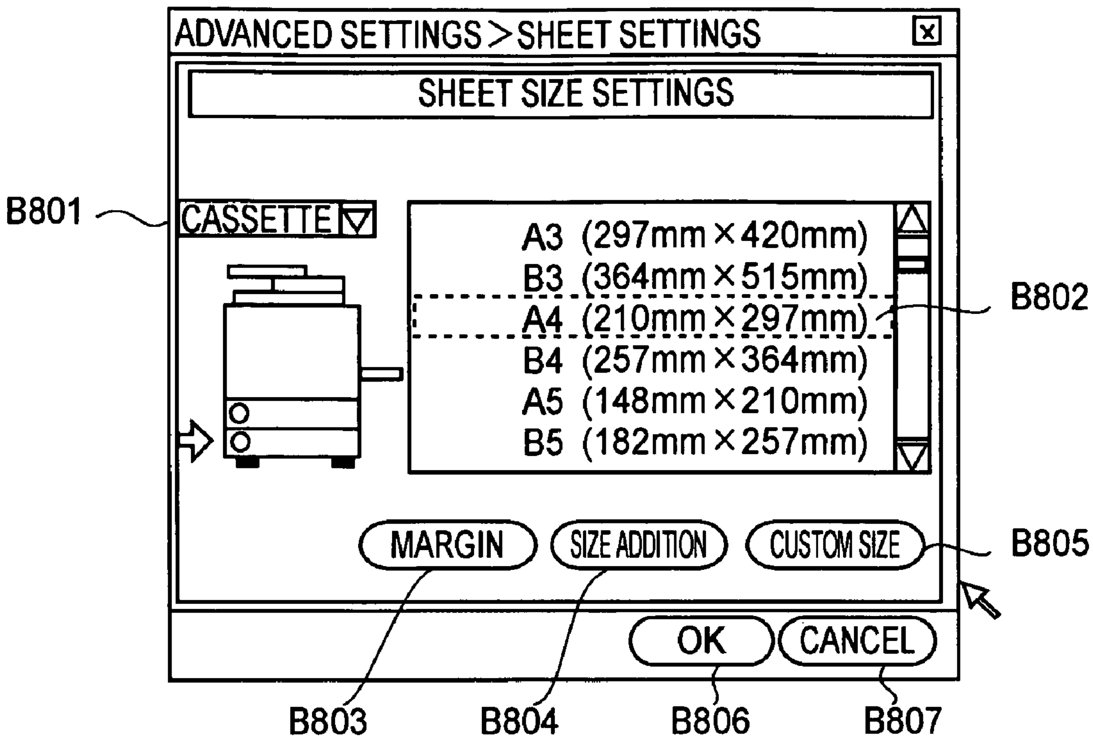
FIGS. 19(*a*), 19(*b*) and 19(*c*) are schematic views each showing an example of a screen displayed on a display of the PC in the still further embodiment of the present invention.
Figure 19B:
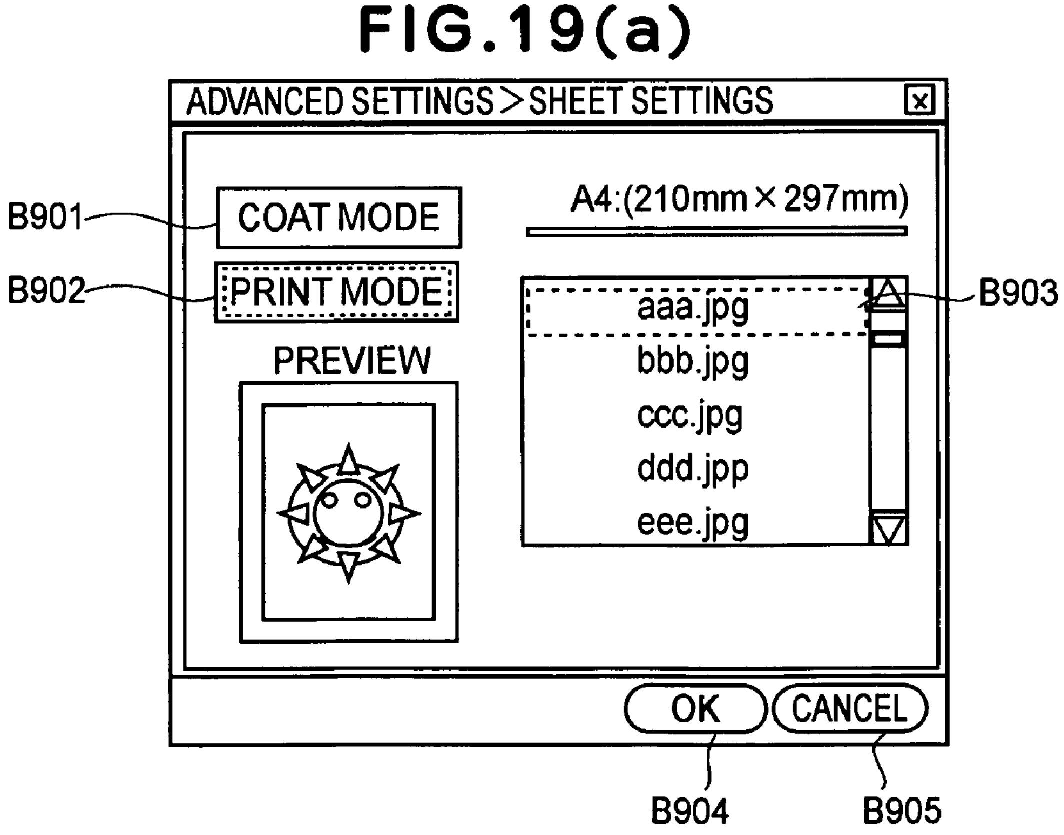
Figure 19C:
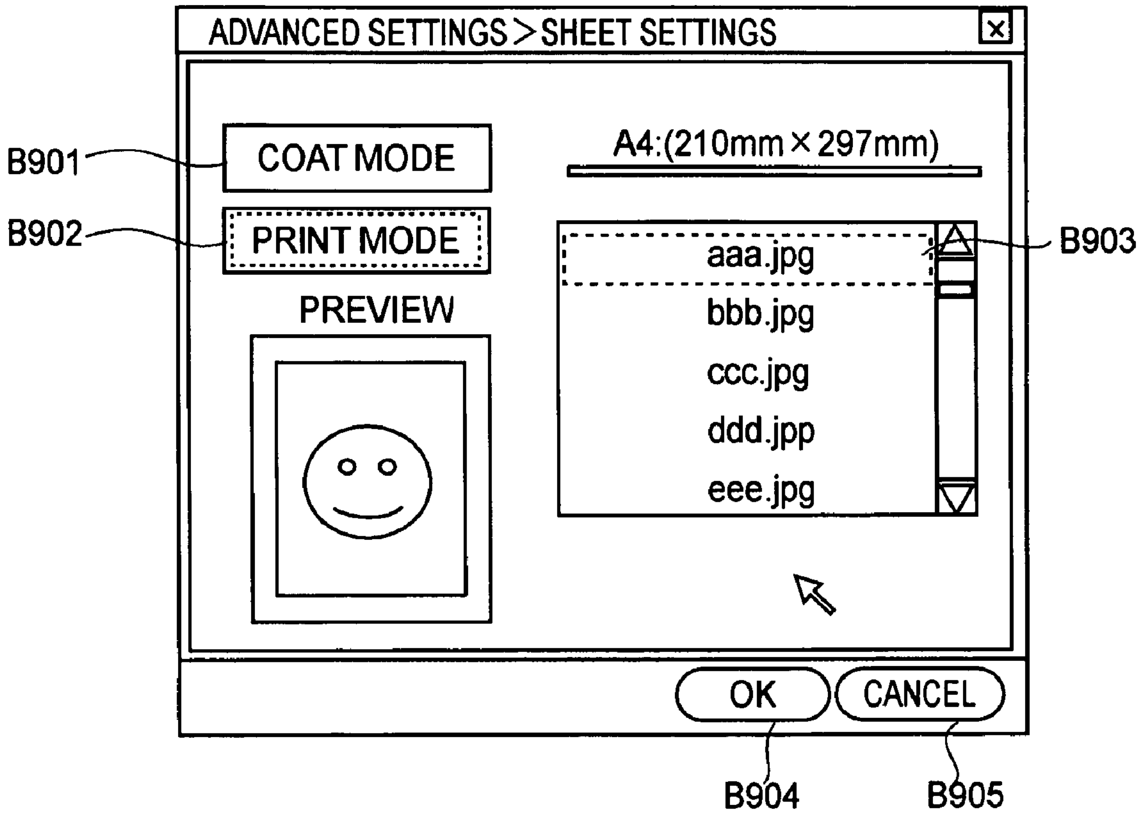

(FIG. 19(*a*))

FIG. 18(*a*) is a schematic view showing an example of the screen displayed on the display 314. In this screen, the user can effect settings for the sheet to be used for the printing.

B801 represents a pull-down menu for changing a portion at which the sheet is stored. The user can set the portion at which the sheet used for the printing by selecting B801. B802 represents a selectably displayed list for changing the size of the sheet used for the printing. In the screen shown in FIG. 19(*a*), the size of the sheet used for the printing is A4 size. In such a setting screen, the set size information of the sheet used for the printing is stored in the RAM 302. B803 represents a button for changing the margin. The user can change the image formable area of the sheet by changing the margin settings. B804 represents a button for adding the sheet size displayed in the list B802. As a result, the sheet size having a low use frequency can be selected from the list B802. B805 represents a button for setting the sheet size in the case where the size of the sheet used for the printing is the custom size.

In a station which the information of the sheet used for the printing is set, the user can reflect the setting information by selecting a button B806 (OK button).

Further, the user can destruct the setting information by selecting a button B807 (cancel button).

(FIGS. 19(*b*) and 19(*c*))

FIGS. 19(*b*) and 19(*c*) are schematic views each showing an example of the screen displayed at the display 314 when the user selects the “TRANSPARENT PRINT SETTINGS”. In the state in which the screen shown in FIG. 19(*b*) is displayed, the user can set a transparent printing mode as transparent print setting information. The user can select the “transparent coat mode” by selecting B901. Further, the user can select the “transparent print mode” by selecting B902. The user can set the transparent printing mode by selecting B901 or B902. In the screen shown in FIG. 19(*b*), the “transparent coat mode” is selected. Further, in the screen shown in FIG. 19(*c*), the “TRANSPARENT PRINT MODE” is selected. Further, in the case where the user selects the "TRANSPARENT PRINT MODE" (B902), it is necessary to designate the image data used for forming the image by using the transparent toner. Therefore, when B902 is selected, the user selects the sheet used for the transparent image formation from a list displayed, at a portion B903. At the portion B903, the image data stored in the HDD 304 is selectably displayed. Hereinafter, information on image data necessary in the transparent printing mode and the transparent print mode is referred to as the transparent print information.

In a state in which the transparent print information is set as described above, the user can store the transparent print information in the RAM 302 by selecting a button B904 (OK button).

Further, the user can destruct the transparent print information by selecting a button B905 (cancel button).

In this manner, the transparent print information and the setting information on the sheet size are stored in the RAM 302. On the basis of the transparent print information and the setting information which have been set by using the above-described screen, the CPU 301 sends, to the MFP 100, instructions to control the MFP 100.

(Operation for Controlling Image Forming Apparatus of PC Along Flow Chart)

In this embodiment, processing corresponding to the processing executed by the CPU 101 is executed by the CPU 301 of the PC 300. Operations in the respective steps are substantially identical to those in the case of Embodiment 1 and therefore will be described along the flow chart shown in FIG. 7.

The PC 300 performs the operations described below by executing a program capable of causing the computer to execute sheets specified below so that image data used for forming the image is sent to the printer portion as the image forming means of the MFP for forming the image on the sheet by using the transparent toner.

S101 represents a step for obtaining the size of the sheet for forming the image. The CPU 301 obtains the transparent print information and the setting information which are stored in the RAM 302.

The CPU 301 as the control means executes processing in a step S103 when the transparent printing mode obtained in the step S101 is the "TRANSPARENT COAT MODE". Further, when the transparent printing mode obtained in the step S101 is the "TRANSPARENT PRINT MODE", the CPU 301 executes processing in a step S104. (S102)

The CPU 301 executes defined processing described later. (S103)

The CPU executes defined processing described later. (S104)

S105 represents a step for sending the image data to the printer portion as the image forming means so that the toner image based on the image data stored in the RAM in the step S103 or S104 is formed on the sheet. The CPU 301 sends the transparent image data stored in the RAM 301 to the MFP 100 as the image forming system through the ethernet I/F 312. In the constitution shown in FIG. 17(*b*), the CPU 301 sends the transparent image data stored in the RAM 302 to the MFP controller 200. The CPU 301 as the control means controls the printer portion so that the transparent image based on the transparent image data send to the MFP 100 is formed on the sheet.

The defined processing step S103 and the defined processing step S104 will be described below in detail.

In the case where the sheet used for the image formation is the custom size, the CPU 301 executes processing in a step S205. Further, in the case where the sheet used for the image formation is the regular size, the CPU 301 executes processing in a step S201. (S201)

When the margin of the sheet used for the image formation is changed, the CPU 301 executes processing in a step S204. Further, when the margin of the sheet used for the image formation is not changed, the CPU 301 executes processing in a step S203. (S202)

The CPU 301 reads, from the HDD 305, the image data for applying the transparent toner onto the entire image formable area of the sheet used for the image formation by using a table storing a relationship between the sheet size and the transparent image data. As a result, when the image data, for applying the transparent toner onto the entire image formable area of the sheet, obtained in the step (S101) for obtaining the image formation sheet size is stored in the HDD 305 as the storing means, the CPU 301 obtains the image data for forming the image on the entire image formable area of the sheet by using the transparent toner. (S203)

The CPU 301 generates the transparent image data based on the changed margin. (S204)

The CPU 301 generates the transparent image data for forming the transparent image on the entire image formable area of the sheet having the custom size obtained in the step S101. (S205)

The CPU 301 stores, in the RAM 302, the transparent image data read from the HDD 305 in the step S203 or the transparent image data generated in the step S204 or S205. (S206)

Then, the defined processing step S104 will be described more specifically. Different from Embodiment 1, in this embodiment, there is no need to provide instructions to read information from the original by using the scanner on the PC side. For that reason, the steps S301 and S303 are not performed. In this embodiment, the defined processing is performed from the step S302.

The CPU 301 reads, from the HDD 305, the image data which has been designated based on the transparent print information and is used for partly forming the transparent image. (S302)

The CPU 301 converts the image data obtained in the step S302 into the transparent image data. (S304)

The CPU 301 stores the transparent image data converted in the step S304 in the RAM 302. (S305)

Then, the PC 300 as the information processing terminal sends the transparent image data to the MFP 100 as the image forming apparatus. As a result, in the case where the "TRANSPARENT COAT MODE" is selected, depending on the sheet size designated in the PC 300, it is possible to control the MFP 100 so as to coat the entire image formable area of the sheet with the transparent toner.

Incidentally, the program for executing the above-described processing may also be supplied from a remote device to an information processing system or an information processing apparatus. Further, the information processing apparatus included in the information processing system may read and execute program mode stored in an external information processing apparatus.

That is, the program itself to be installed in the information processing apparatus is used for realizing the above-described processing. The form of the program is not limited so long as the information processing apparatus can execute the above-described processing by using the program.

As a recording medium for supplying the program, e.g., it is possible to use a flexible disk, a hard disk, an optical disk, a magneto-optical disk, a CD-ROM (compact-disk read-only memory), a CD-R (compact disk-recordable), a CD-RW (compact disk-rewritable), and the like. Further, as the recording medium, it is also possible to use a magnetic tape, a non-volatile memory card, an ROM, a DVD (digital versatile disk) (DVD-ROM or DVR-R (recordable)), and the like.

Further, in the MFP 100, the program may also be downloaded from the network through the ethernet I/F 114. Further, in the MFP controller 200 and the PC 300, the program may also be downloaded from a homepage (web site) on the Internet by using a browser. That is, from the homepage, the program itself or a program file which is compressed and has an auto-install function is downloaded into the recording medium such as the hard disk. Further, it is also possible to obtain the program by dividing a program constituting the program for executing the above-described processing into a plurality of files and by downloading the divided files from different homepages, respectively. That is, there is a possibility that a WWW (world wide web) server capable of downloading a program file with respect to a plurality of users constitutes a constituent feature.

Further, the program file may also be distributed to the users by being encrypted and then being stored in a storage medium such as the CD-ROM. In this case, it is also possible to permit only a user who fulfils a predetermined requirement (condition) to download key information for decrypting the encrypted program, execute the decryption of the encrypted program with the key information, and install the program into the information processing apparatus.

Incidentally, on the basis of instructions from the program, the OS running on the information processing apparatus may also execute a part or all of actual processing.

Further, the program read from the recording medium may also be written (stored) in a memory provided to a function expanding board inserted into the information processing apparatus or a function extending unit connected to the information processing apparatus. On the basis of the instructions, a CPU provided in the function expanding board or the function extending unit may also execute a part or all of the actual processing.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 122963/2008 filed May 9, 2008 and 094619/2009 filed Apr. 9, 2009, which are hereby incorporated by reference.

What is claimed is:

1. An image forming system comprising:

an image forming device configured to form a transparent image on a sheet by using transparent toner;

a fixing device configured to fix the transparent image formed on the sheet;

a size obtaining device configured to obtain information corresponding to a size of the sheet on which an image is to be formed;

a storing device configured to store image data including:

first image data for forming the transparent image on an entire image formable area of a sheet, the entire image formable area having a size smaller than a first size by a margin, and second image data for forming the transparent image on an entire image formable area of a sheet, the entire image formable area having a size smaller than a second size by a margin, the second size being different from the first size;

a selecting device configured to select the first image data when the size of the sheet obtained by said size obtaining device is the first size and to select the second image data when the size of the sheet obtained by said size obtaining device is the second size; and a controller for controlling said image forming device so that the transparent image is formed on the sheet on the basis of the image data selected by said selecting device.

2. A system according to claim 1, further comprising:

a glossing device configured to gloss the transparent image fixed on the sheet by said fixing device, wherein said controller controls said image forming device so as to select one of a plurality of modes including (i) a first mode for glossing the transparent image, fixed by using said fixing device after being formed on the entire image formable area of the sheet, by said glossing device, and (ii) a second mode for fixing the transparent image formed on the entire image formable area of the sheet, so as to form the transparent image on the sheet in the selected mode.

3. A system according to claim 1, further comprising:

a gloss obtaining device configured to obtain information corresponding to a gloss of the sheet; and a glossing device configured to gloss the transparent image fixed on the sheet by said fixing device when the information corresponding to a gloss of the sheet obtained by said gloss obtaining means is not less than a predetermined value, wherein said controller controls said image forming device so as to fix the transparent image formed on the entire image formable area of the sheet by said fixing device and so as to gloss the transparent image, fixed by said fixing device, by said glossing device.

4. A system according to claim 1, further comprising:

a generating device for generating image data for forming the transparent image on the entire image formable area of the sheet having the size obtained by said size obtaining device, wherein when the image data corresponding to the size obtained by said size obtaining device is not stored in said storing device, said controller controls said image forming device so that the transparent image on the basis of the image data generated by said generating device is formed on the sheet.

* * * * *